United States Patent
Bourke et al.

(10) Patent No.: US 10,886,512 B2
(45) Date of Patent: Jan. 5, 2021

(54) METHODS AND SYSTEMS FOR BATTERY PACK THERMAL MANAGEMENT

(71) Applicant: Canoo Inc., Torrance, CA (US)

(72) Inventors: Deborah Bourke, San Diego, CA (US); Michael Fricke, Culver City, CA (US); David Tarlau, Torrance, CA (US); Phillip Weicker, Los Angeles, CA (US); Berton Vite, Huntington Beach, CA (US); Hrayr Torosyan, Torrance, CA (US); Cody Joel Rhebergen, Lomita, CA (US)

(73) Assignee: Canoo Inc., Torrance, CA (US)

( * ) Notice: Subject to any disclaimer, the term of this patent is extended or adjusted under 35 U.S.C. 154(b) by 0 days.

(21) Appl. No.: 16/736,698

(22) Filed: Jan. 7, 2020

(65) Prior Publication Data
US 2020/0220132 A1 Jul. 9, 2020

Related U.S. Application Data

(60) Provisional application No. 62/789,110, filed on Jan. 7, 2019.

(51) Int. Cl.
*H01M 2/10* (2006.01)
*B60L 58/25* (2019.01)
(Continued)

(52) U.S. Cl.
CPC ........... *H01M 2/1077* (2013.01); *B60L 58/25* (2019.02); *H01M 10/613* (2015.04);
(Continued)

(58) Field of Classification Search
CPC ............. H01M 2/1077; H01M 10/663; H01M 10/613; H01M 10/6557; H01M 10/0525; H01M 10/625; H01M 10/643
See application file for complete search history.

(56) References Cited

U.S. PATENT DOCUMENTS

| 8,647,763 B2 | 2/2014 | Tennessen et al. |
| 9,912,023 B1 | 3/2018 | Mastrandrea et al. |

(Continued)

FOREIGN PATENT DOCUMENTS

DE 102006059989 * 6/2008

*Primary Examiner* — Ula C Ruddock
*Assistant Examiner* — Matthew W Van Oudenaren
(74) *Attorney, Agent, or Firm* — Kwan & Olynick LLP

(57) ABSTRACT

Provided are methods and systems for battery pack thermal management, such as heating and cooling of individual batteries arranged into battery packs. The methods and systems use thermal control modules, specifically configured to thermally couple to the side wall and the bottom end of each battery in a battery pack. In some examples, a thermal control module comprises a thermal plate and one or two battery engagement components, connected and thermally coupled to the thermal plate. Each battery engagement component comprises a plurality of battery receiving openings. When the batteries are installed into these openings, the side wall and the bottom end of each battery are thermally coupled to the thermal control module, A thermal fluid is circulated through at least the thermal plate to provide cooling or heating to the batteries without any direct contact between the thermal fluid and the batteries,

20 Claims, 21 Drawing Sheets

(51) Int. Cl.
*H01M 10/613* (2014.01)
*H01M 10/6557* (2014.01)
*H01M 10/663* (2014.01)
H01M 10/0525 (2010.01)
H01M 10/625 (2014.01)
H01M 10/643 (2014.01)

(52) U.S. Cl.
CPC ..... *H01M 10/6557* (2015.04); *H01M 10/663* (2015.04); *H01M 10/0525* (2013.01); *H01M 10/625* (2015.04); *H01M 10/643* (2015.04)

(56) References Cited

U.S. PATENT DOCUMENTS

| | | | |
|---|---|---|---|
| 2008/0299448 A1* | 12/2008 | Buck | H01M 10/6553 429/120 |
| 2010/0104938 A1 | 4/2010 | Hermann | |
| 2012/0107663 A1* | 5/2012 | Burgers | F28F 3/12 429/120 |
| 2017/0005377 A1 | 1/2017 | Rong | |
| 2017/0301964 A1* | 10/2017 | Murakami | H01M 2/10 |
| 2018/0145382 A1* | 5/2018 | Harris | H01M 10/6567 |

\* cited by examiner

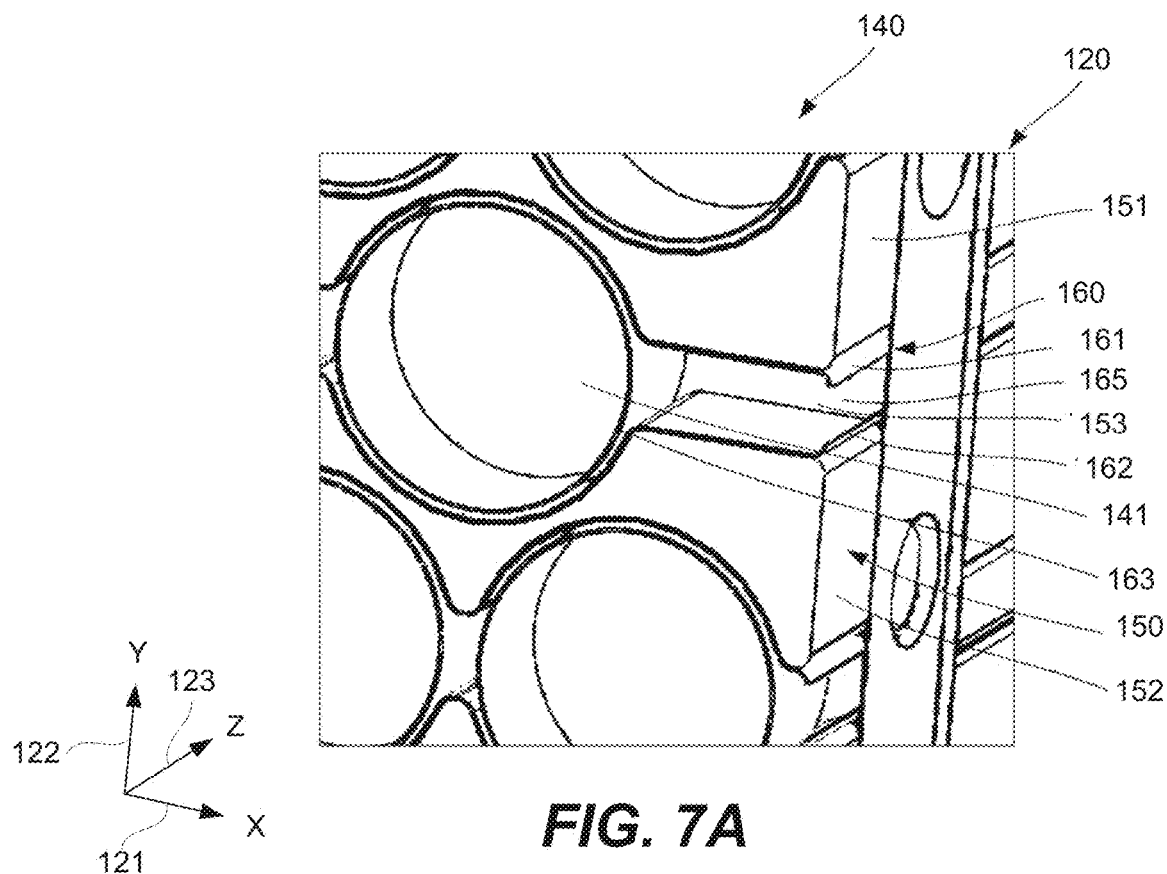
*FIG. 7A*
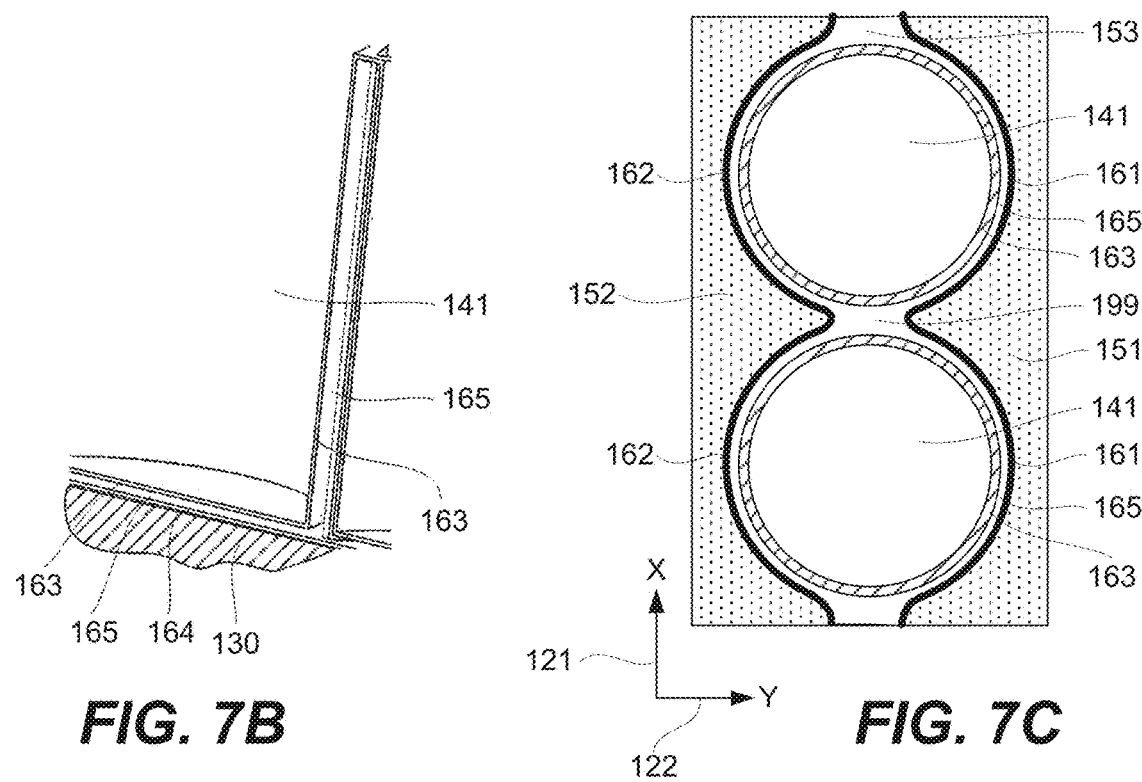
*FIG. 7B*   *FIG. 7C*

METHODS AND SYSTEMS FOR BATTERY PACK THERMAL MANAGEMENT

CROSS-REFERENCE TO RELATED APPLICATIONS

This application claims the benefit under 35 U.S.C. § 119(e) of U.S. Provisional Patent Application No. 62/789,110, entitled: "Methods and Systems for Battery Pack Thermal Management", filed on Jan. 7, 2019, which is incorporated herein by reference in its entirety for all purposes.

BACKGROUND

Various powered systems (e.g., electric vehicles) use battery packs to store electrical energy. The performance of the batteries in these packs depends on their temperature. For example, most lithium-Ion batteries have a relatively narrow operating range of 0-50° C. Attempting to charge or discharge lithium-Ion batteries outside of this temperature range can cause permanent damage to the batteries and even unsafe conditions, especially when the batteries are overheated. On the other hand, thermal management of battery packs is challenging, especially of large battery packs used in electrical vehicles. In addition to environmental factors (e.g., cold or hot ambient temperatures), batteries experience internal heating during their operation, such as charge and discharge. The heat, generated inside a battery during its charge and/or discharge, is proportional to the square of the current multiplied by the internal resistance of the battery ($P=I^2 \times R$). At the same time, higher charge-discharge currents are often needed for various applications, e.g., faster charging and acceleration of electric vehicles and electric grid balancing, which further complicates thermal management inside battery packs.

What is needed are methods and systems for battery pack thermal management, in particular, active battery cooling and heating.

SUMMARY

Provided are methods and systems for battery pack thermal management, such as heating and cooling of individual batteries arranged into battery packs. The methods and systems use thermal control modules, specifically configured to thermally couple to the side wall and the bottom end of each battery in a battery pack. In some examples, a thermal control module comprises a thermal plate and one or two battery engagement components, connected and thermally coupled to the thermal plate. Each battery engagement component comprises a plurality of battery receiving openings. When the batteries are installed into these openings, the side wall and the bottom end of each battery are thermally coupled to the thermal control module, A thermal fluid is circulated through at least the thermal plate to provide cooling or heating to the batteries without any direct contact between the thermal fluid and the batteries, These and other examples are described further below with reference to the figures.

BRIEF DESCRIPTION OF THE DRAWINGS

Figure 1A:
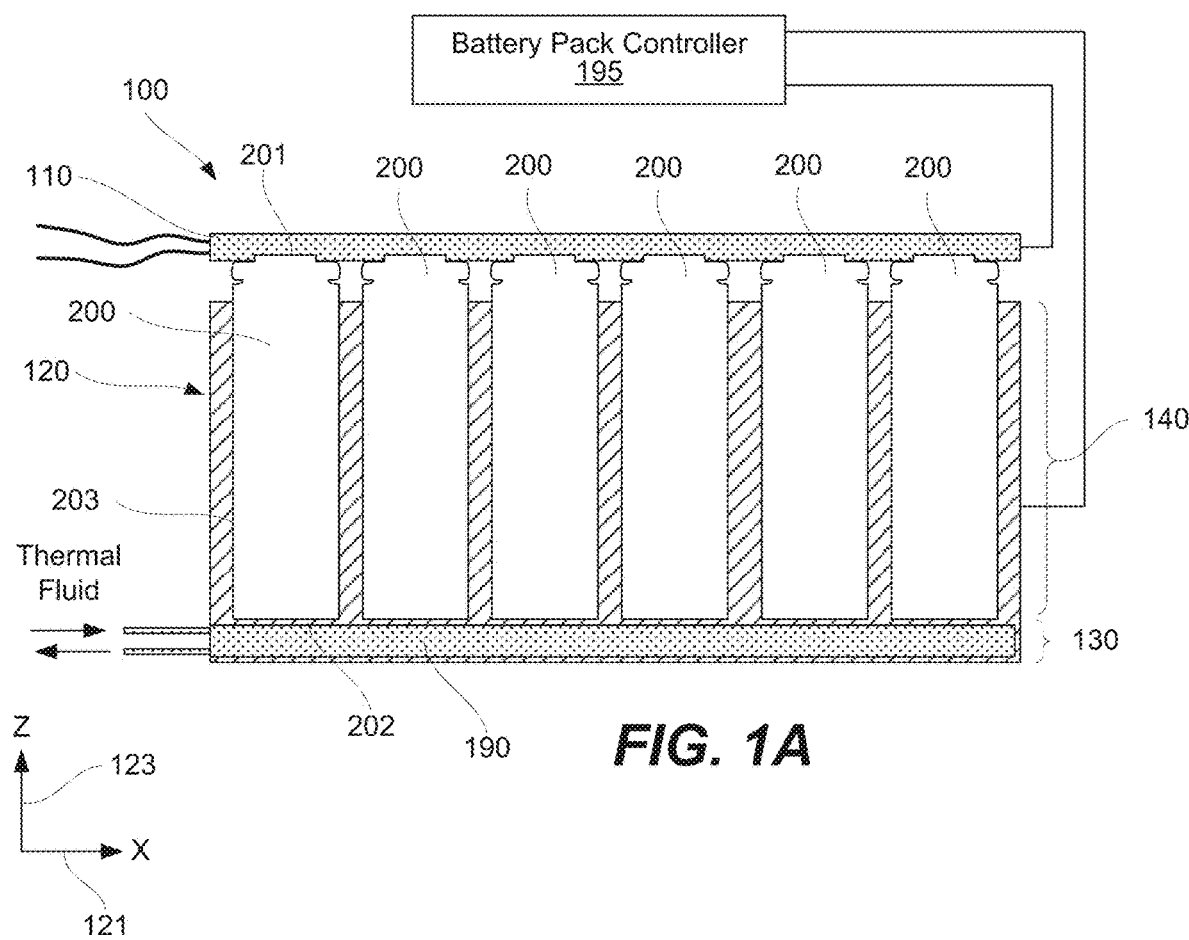

Having thus described examples of the disclosure in general terms, reference will now be made to the accompanying drawings, which are not necessarily drawn to scale, and wherein like reference characters designate the same or similar parts throughout the several views, and wherein:

FIG. 1A is a schematic cross-sectional representation of a battery pack, comprising a thermal control module and an electrical interconnect module, in accordance with some examples.

Figure 1B:
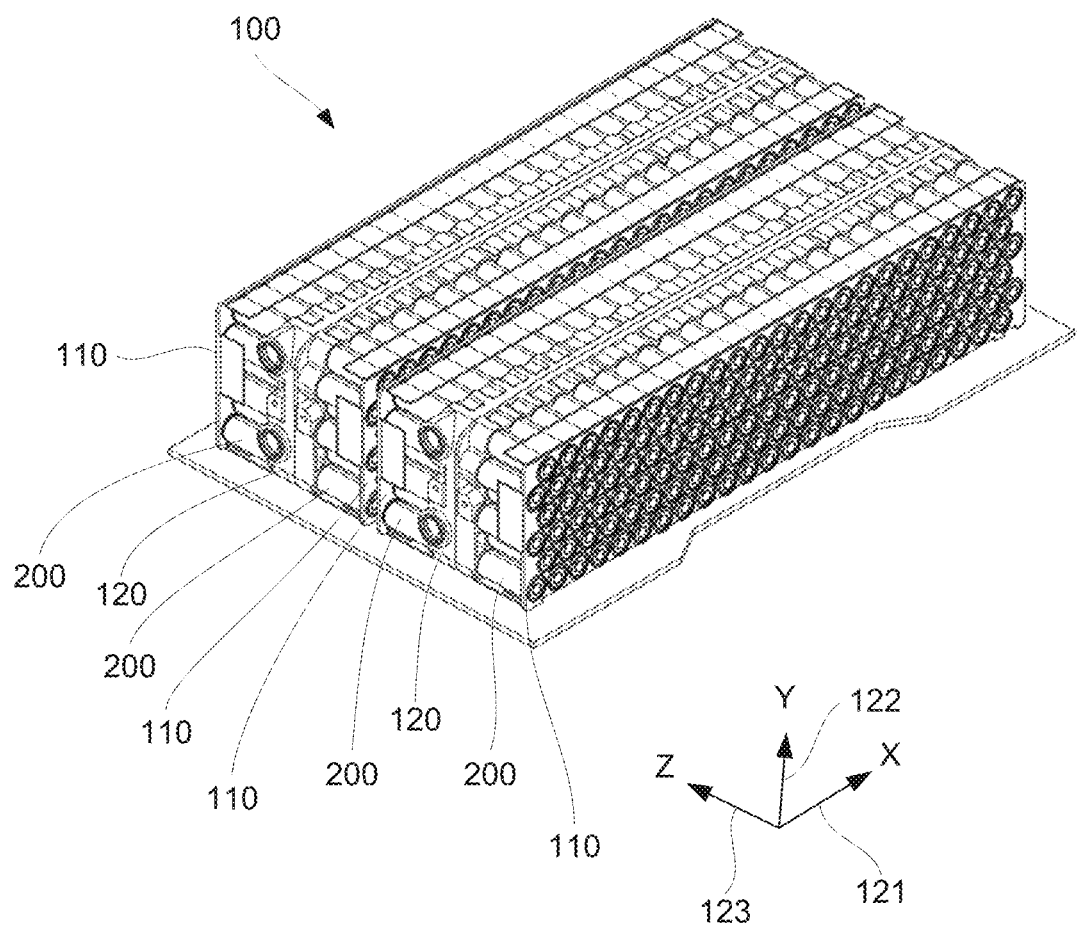

FIG. 1B is a schematic perspective representation of the battery pack, comprising multiple thermal control modules and electrical interconnect modules, in accordance with some examples.

Figure 2A:
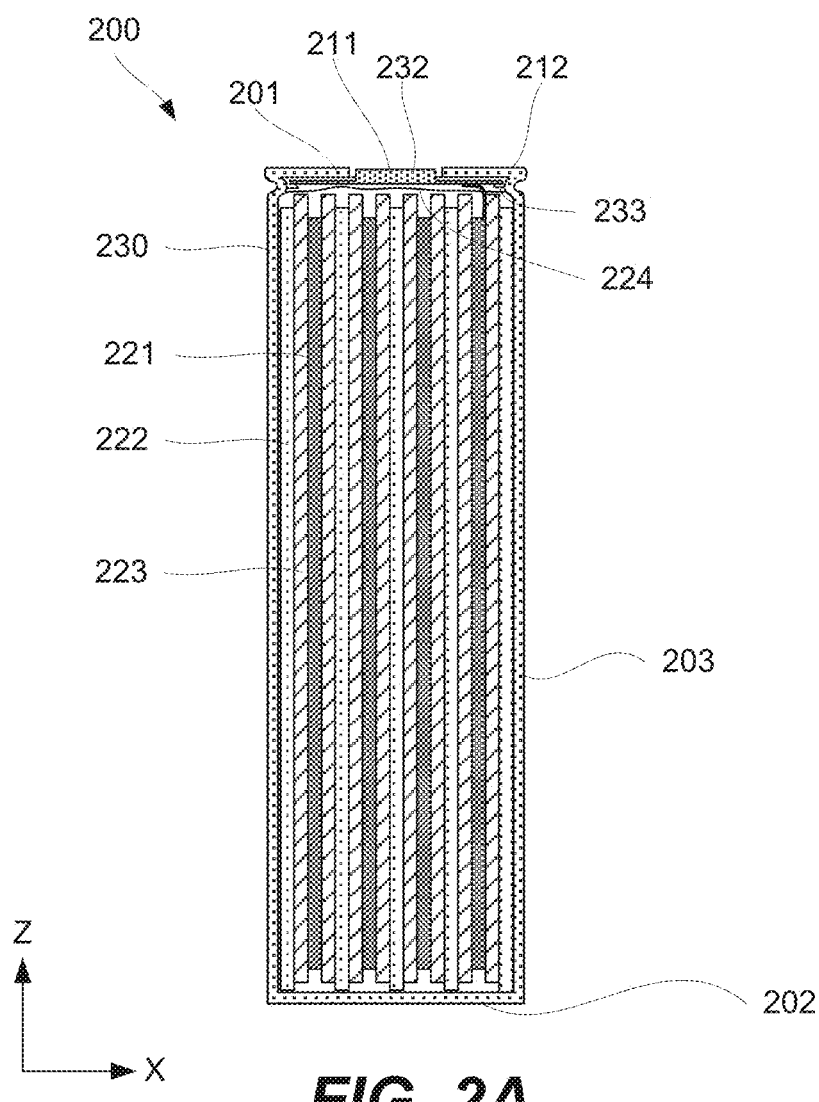

FIG. 2A is a schematic cross-sectional side view of a battery, showing various internal components of the battery, in accordance with some examples.

Figure 2B:
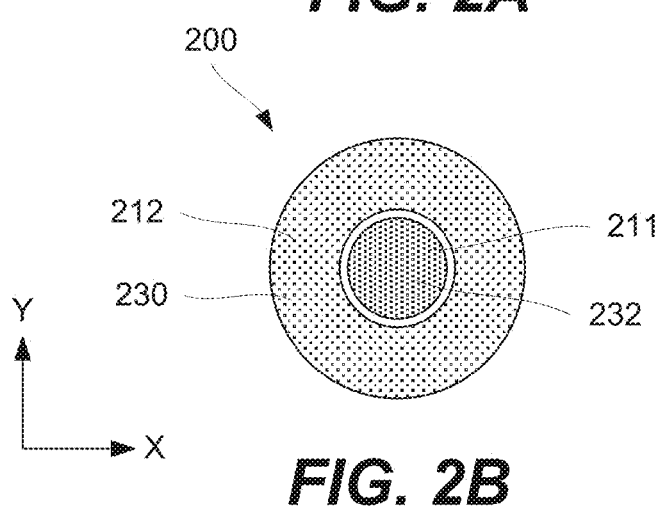

FIG. 2B is a schematic top view of the battery of FIG. 2A, showing two contacts, in accordance with some examples.

Figure 3A:
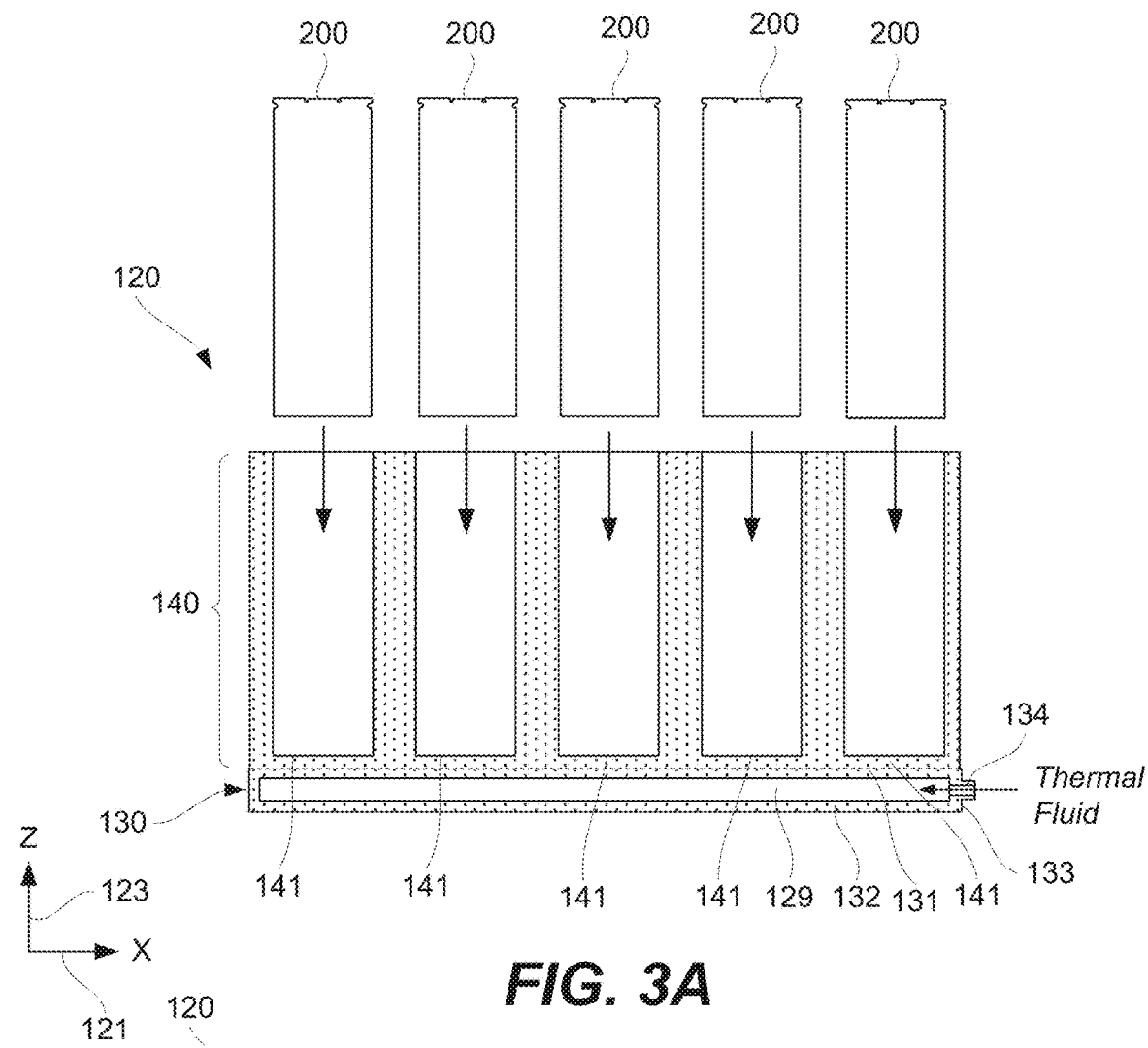

FIG. 3A is a schematic cross-sectional view of a thermal control module, prior to placing batteries into battery receiving openings of the thermal control module, in accordance with some examples.

Figure 3B:
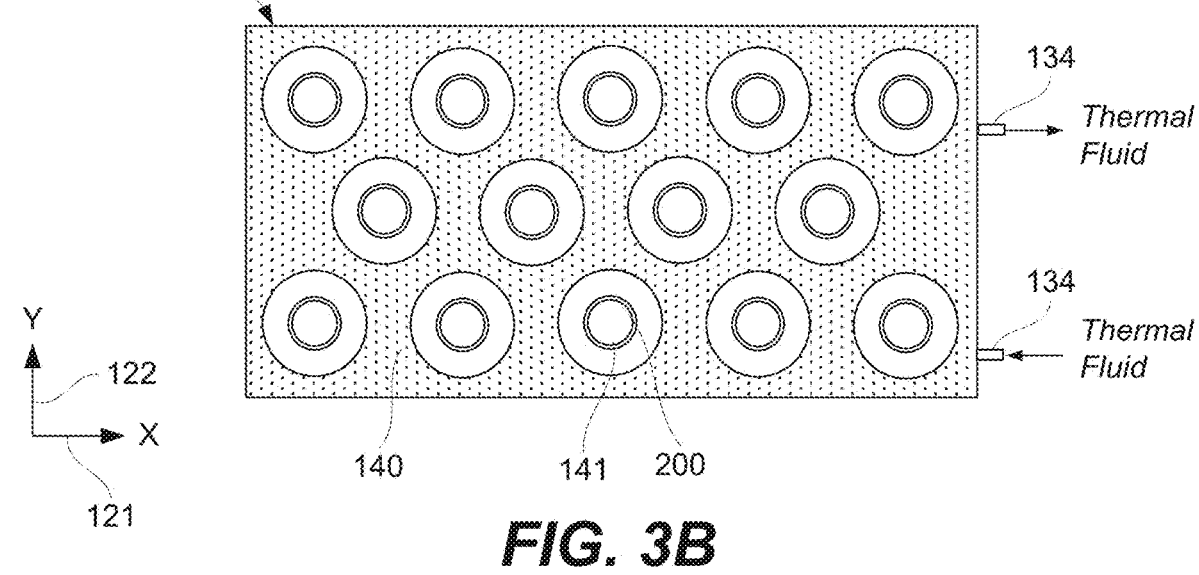

FIG. 3B is a schematic top view of the thermal control module of FIG. 3A, showing batteries positioned in the battery receiving openings, in accordance with some examples.

Figure 3C:
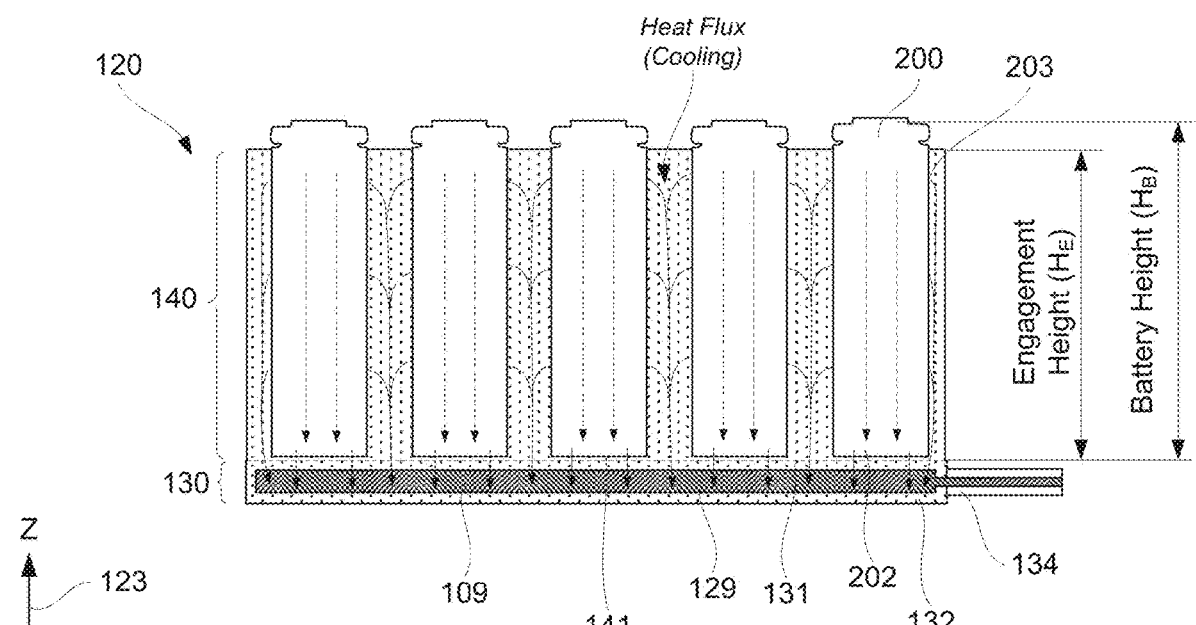

FIG. 3C is a schematic cross-sectional view of the thermal control module of FIG. 3B, showing heat transfer from the batteries to the thermal plate (and to the thermal fluid) through the battery engagement component, in accordance with some examples.

Figure 3D:
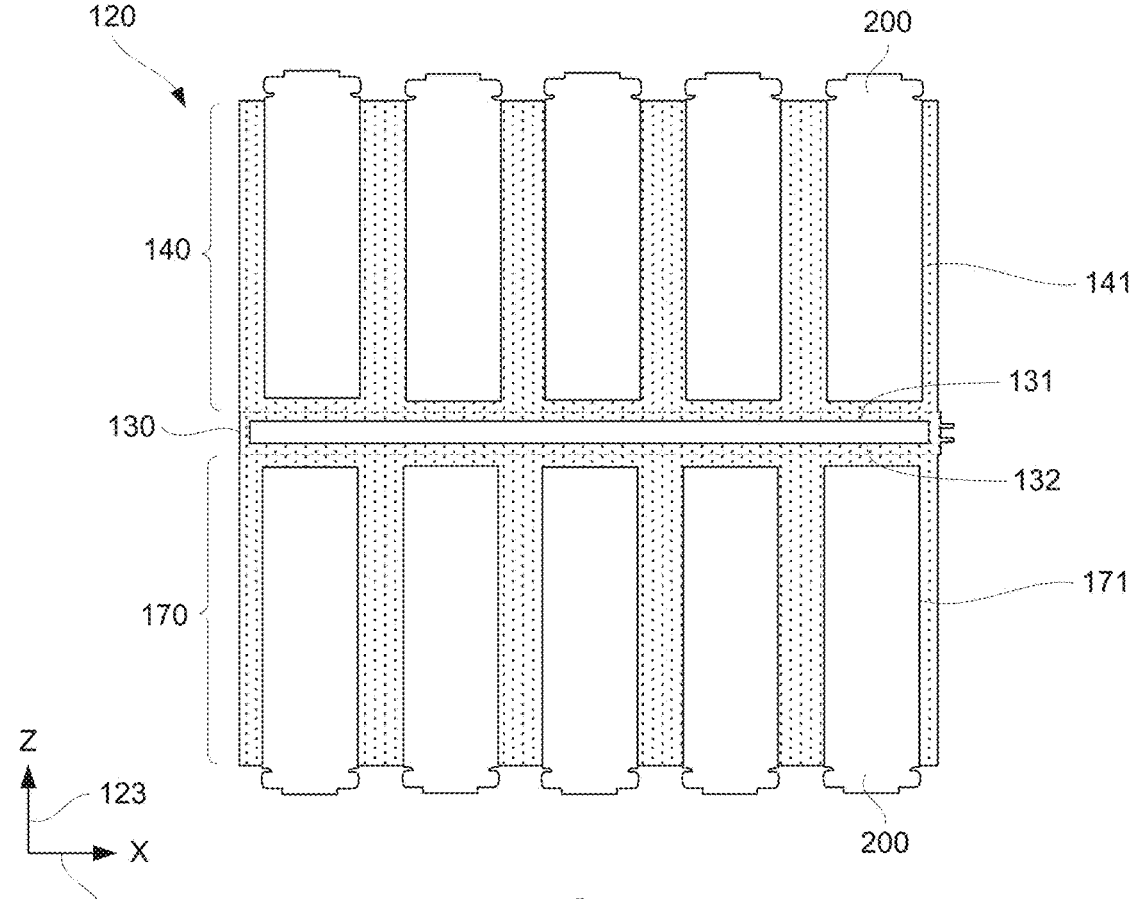

FIG. 3D is a schematic cross-sectional view of another example of the thermal control module, comprising a thermal plate and two battery engagement components.

Figure 4A:
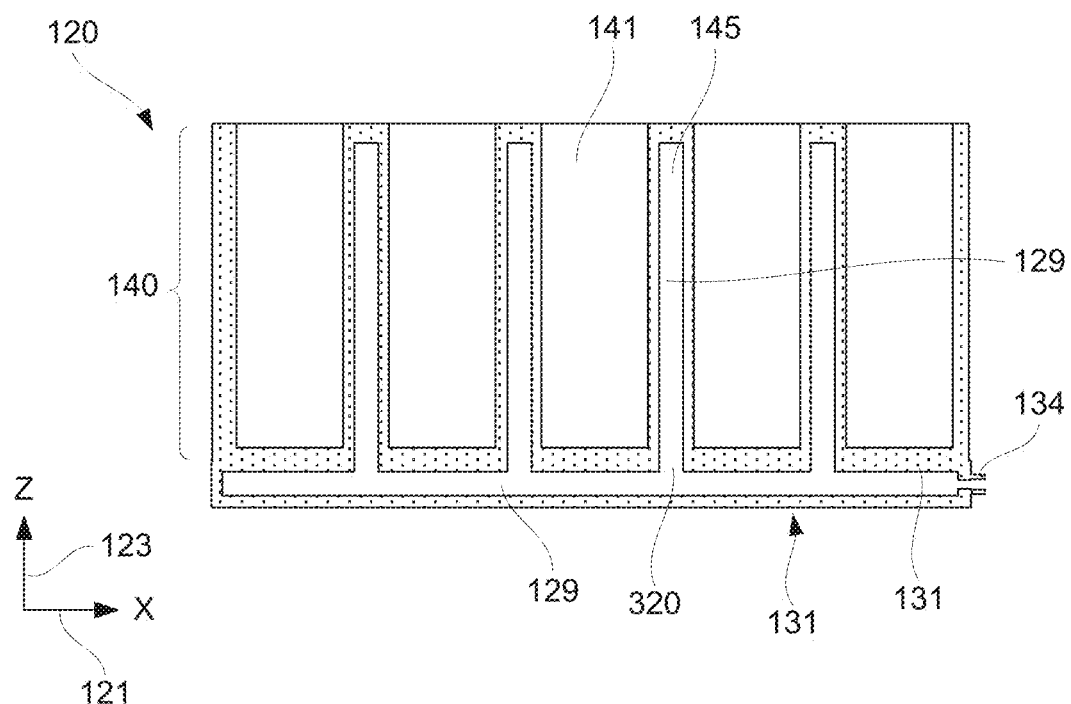

FIG. 4A is a schematic cross-sectional view of a thermal control module, comprising a thermal plate and a battery engagement component with flow channels extending between the thermal plate and the battery engagement component, in accordance with some examples.

Figure 4B:
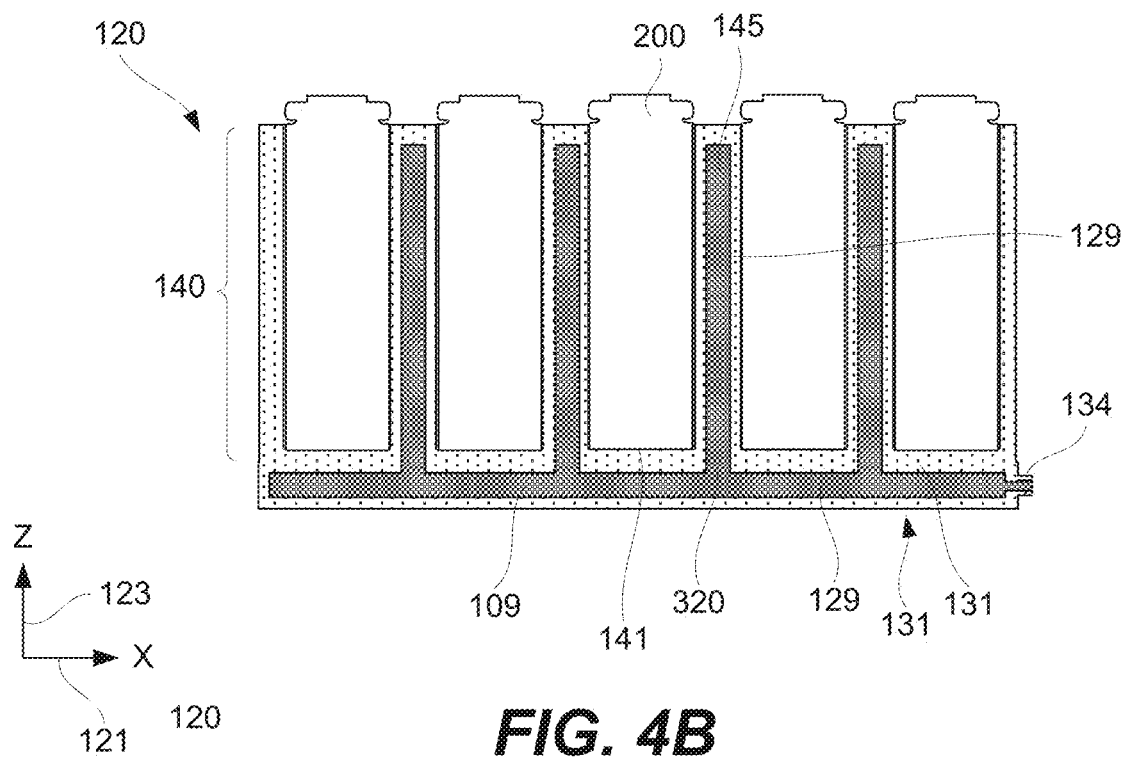

FIG. 4B is a schematic cross-sectional view of the thermal control module of FIG. 4A, showing thermal fluid flowing through the flow channels in the thermal plate and the battery engagement component, in accordance with some examples.

Figure 4C:
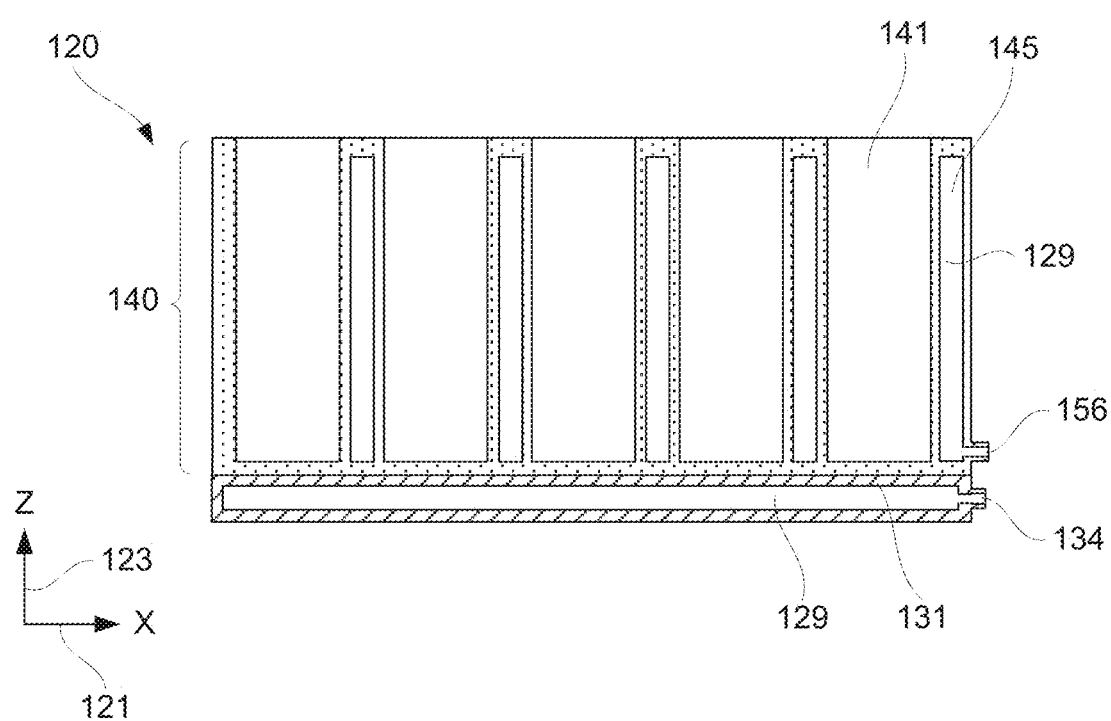

FIG. 4C is a schematic cross-sectional view of a thermal control module, comprising a thermal plate and a battery engagement component with separate flow channels in the thermal plate and the battery engagement component, in accordance with some examples.

Figure 5A:
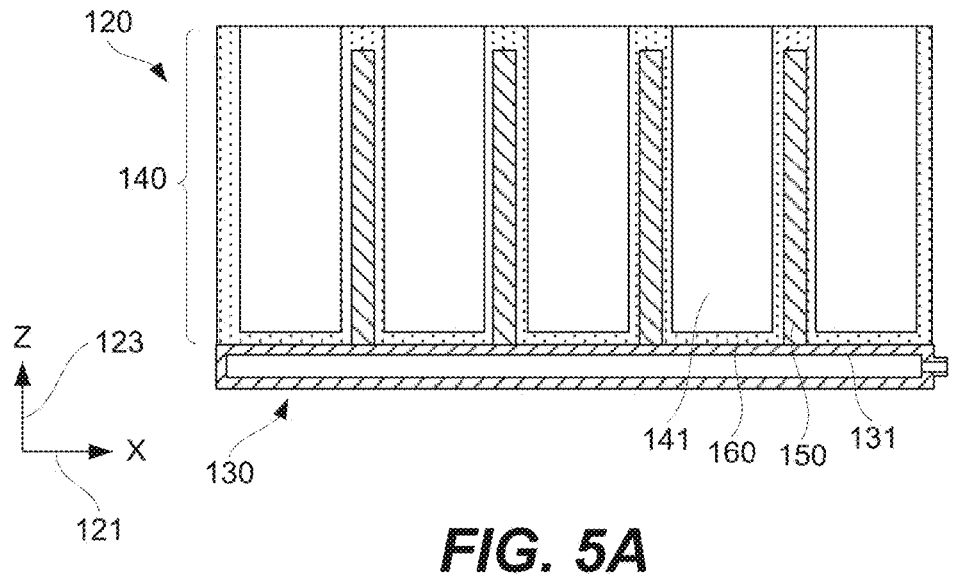

FIG. 5A is a schematic cross-sectional view of a thermal control module, in which a battery engagement component comprises a thermal extension and an electrically-insulating sleeve or an electrically-insulating coating, in accordance with some examples.

Figure 5B:
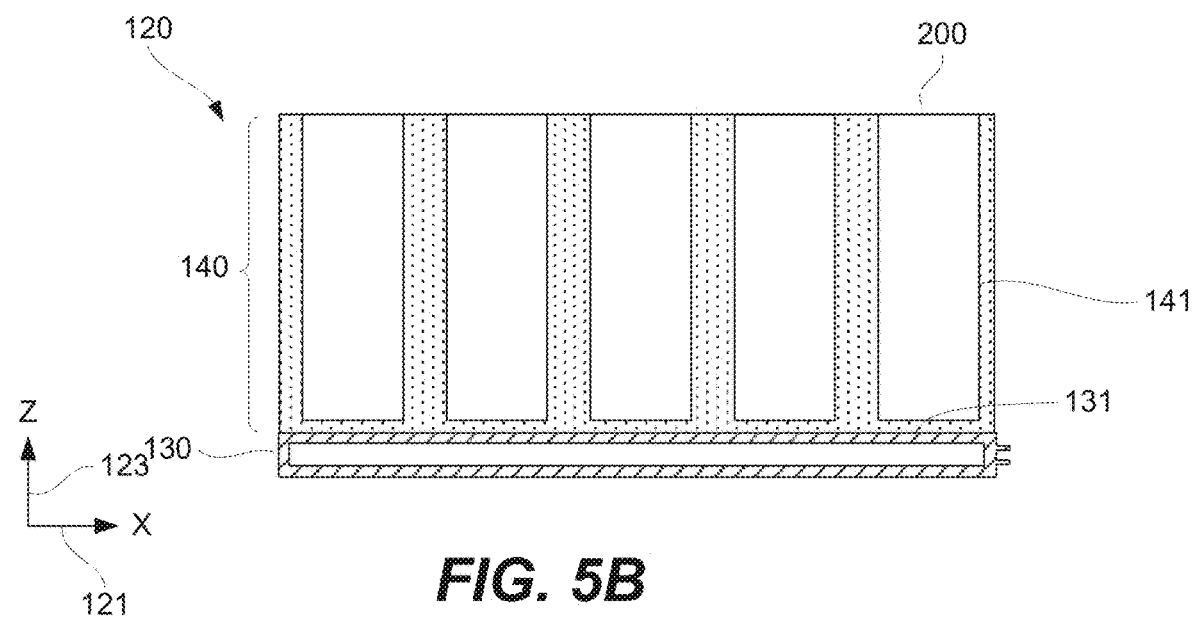

FIG. 5B is a schematic cross-sectional view of a thermal control module, comprising a thermal plate and a battery engagement component, formed as separate components, in accordance with some examples.

Figure 6A:
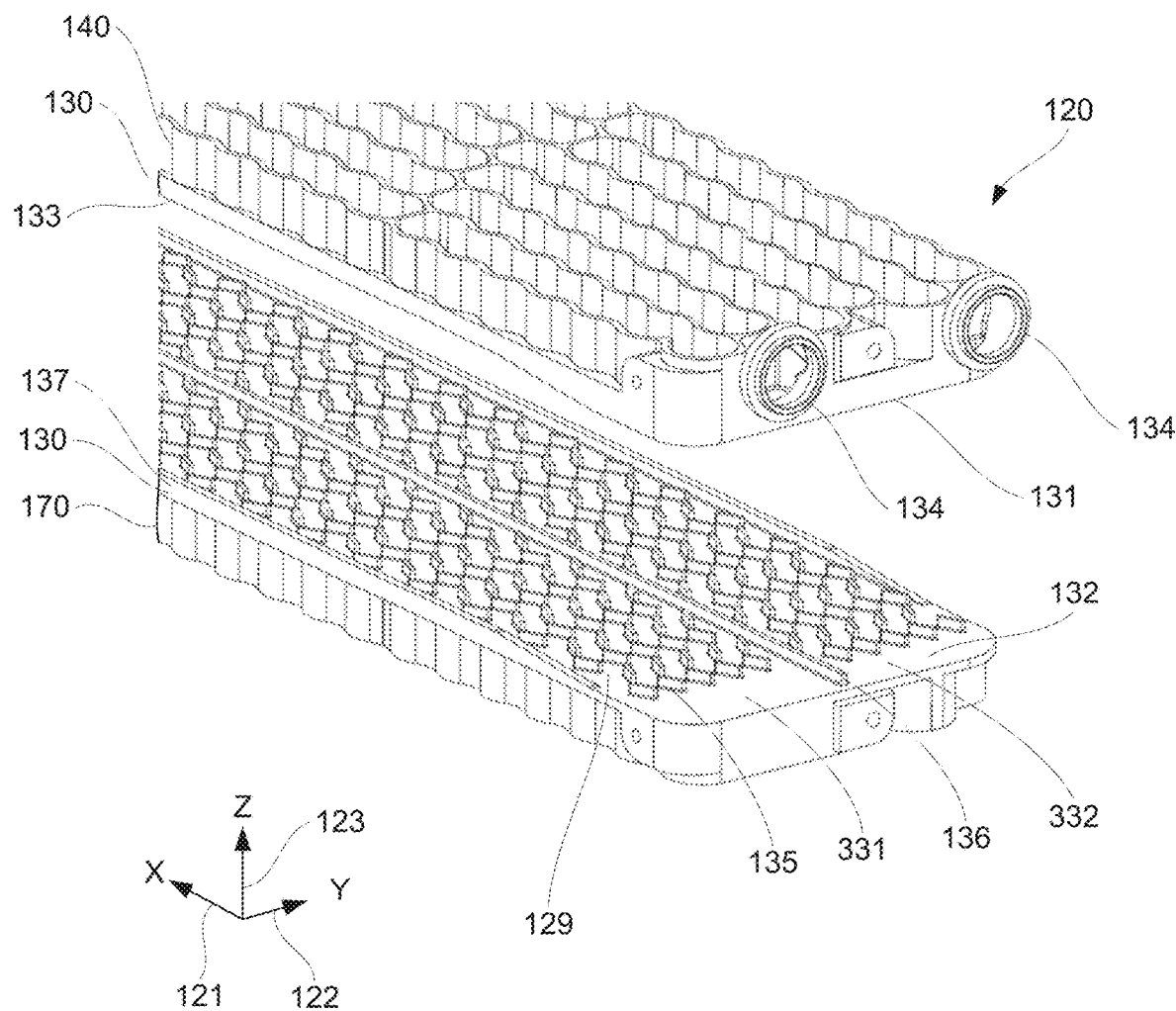

FIG. 6A is an exploded schematic view of a thermal control module, showing two portions of the thermal plate, in accordance with some examples.

Figure 6B:
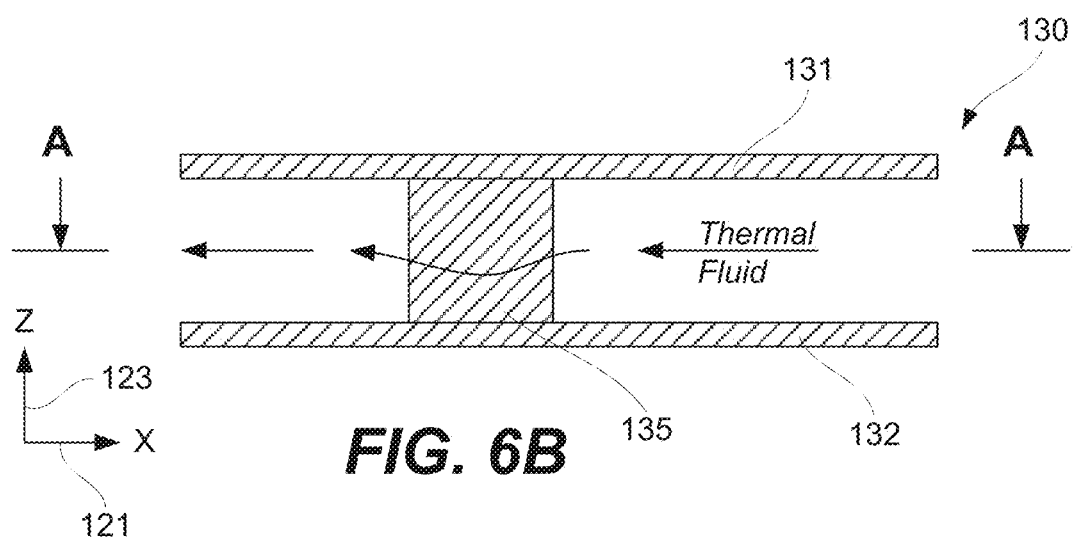

FIG. 6B is a side cross-sectional view of a thermal plate, in accordance with some examples.

Figure 6C:
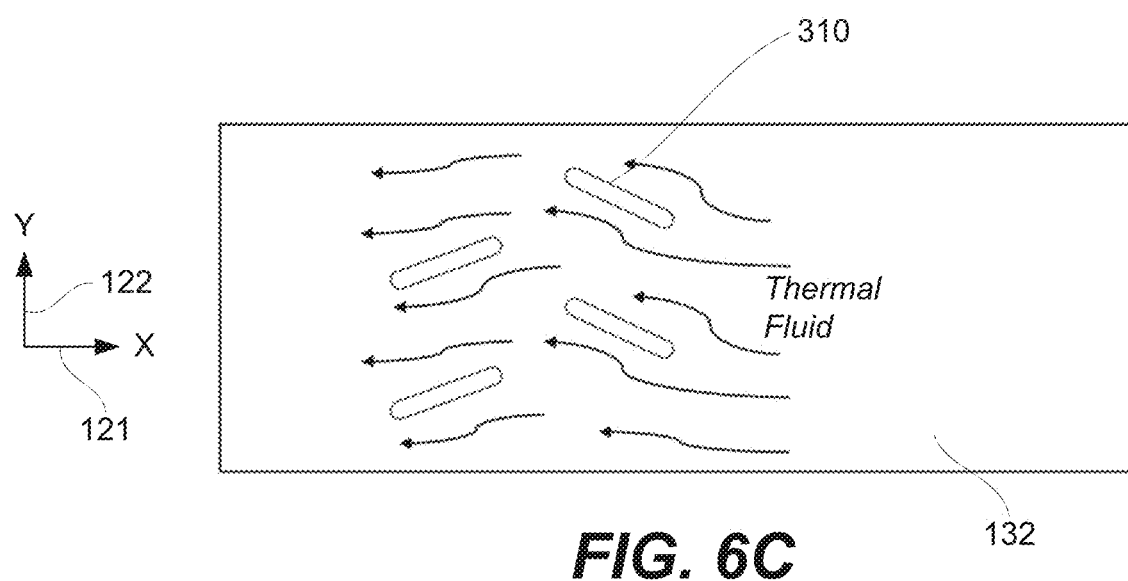

FIG. 6C is a top cross-sectional view of a thermal plate, in accordance with some examples.

Figure 6D:
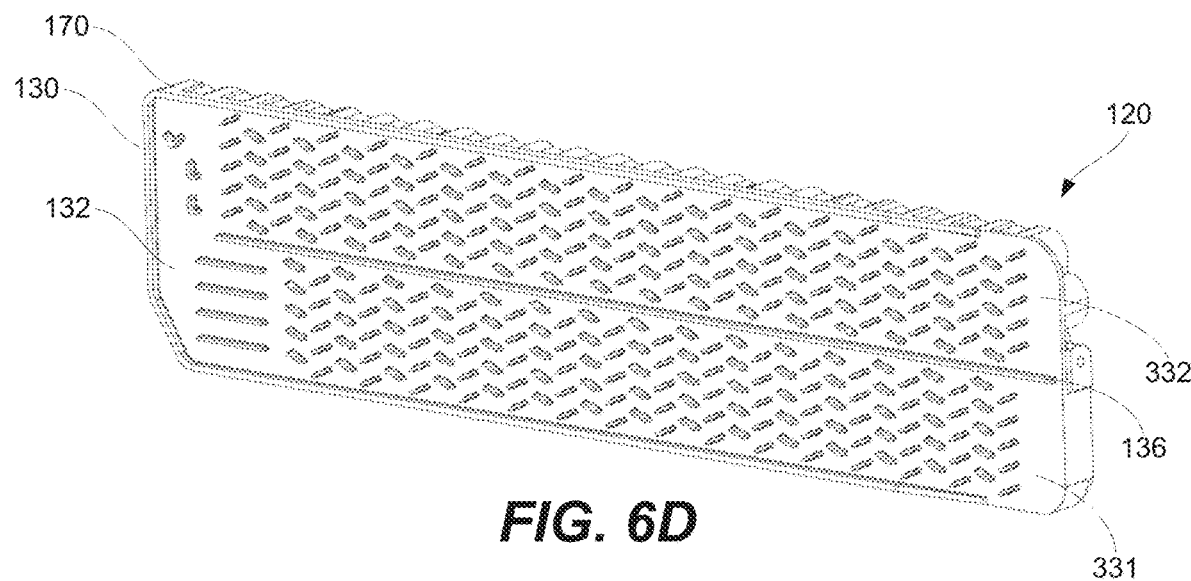

FIG. 6D is a perspective view of one portion of a thermal control module, in accordance with some examples.

Figure 6E:
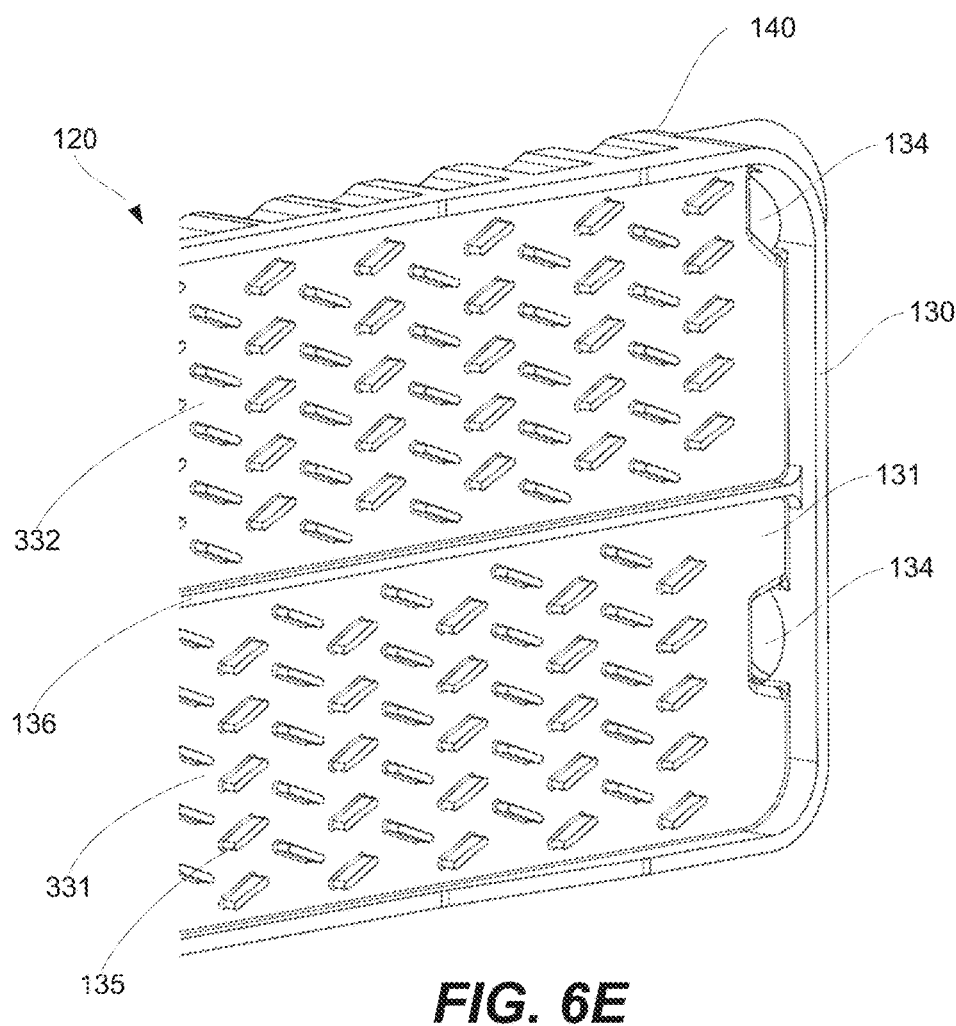

FIG. 6E is a perspective expanded view of a part of another portion of a thermal control module, in accordance with some examples.

FIG. 7A is a schematic perspective view of a thermal control module, in accordance with some examples.

FIG. 7B is a cross-sectional view of the thermal control module shown in FIG. 7A, in accordance with some examples.

FIG. 7C is a top view of the thermal control module of FIG. 7A, showing fluid channels in a sleeve, in accordance with some examples.

Figure 7D:
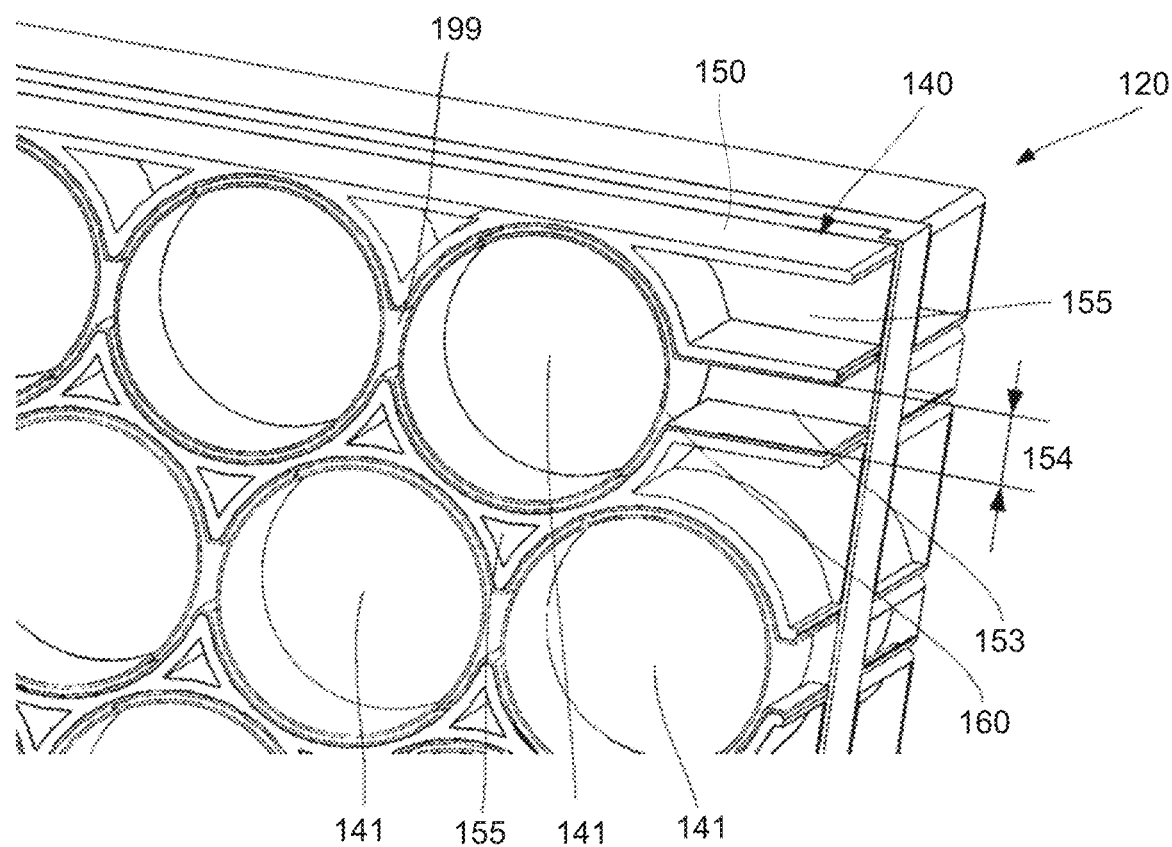

FIG. 7D is another example of fluid channels in the sleeve and the battery engagement component, in accordance with some examples.

Figure 8A:
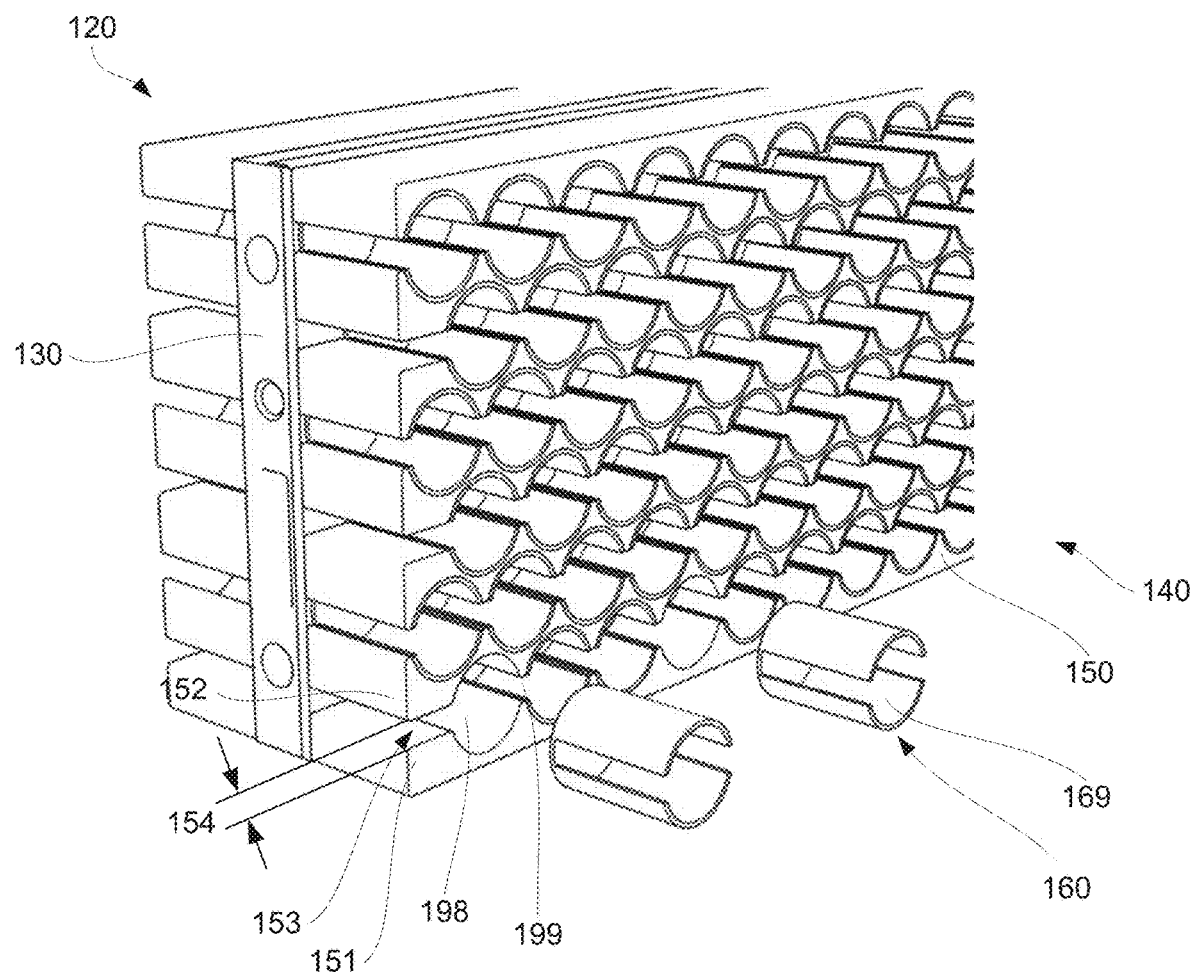

FIG. 8A is a schematic perspective view of a thermal control module, in which the sleeve is formed by a plurality of sleeve cups, in accordance with some examples.

Figure 8B:
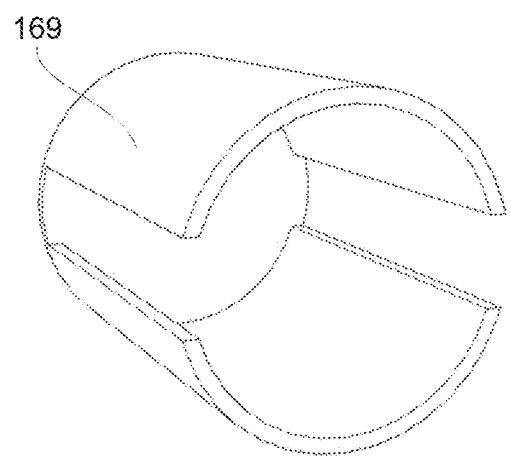

FIG. 8B is a schematic perspective view of a sleeve cup, forming a portion of the sleeve in the thermal control module shown in FIG. 8A, in accordance with some examples.

Figure 9:
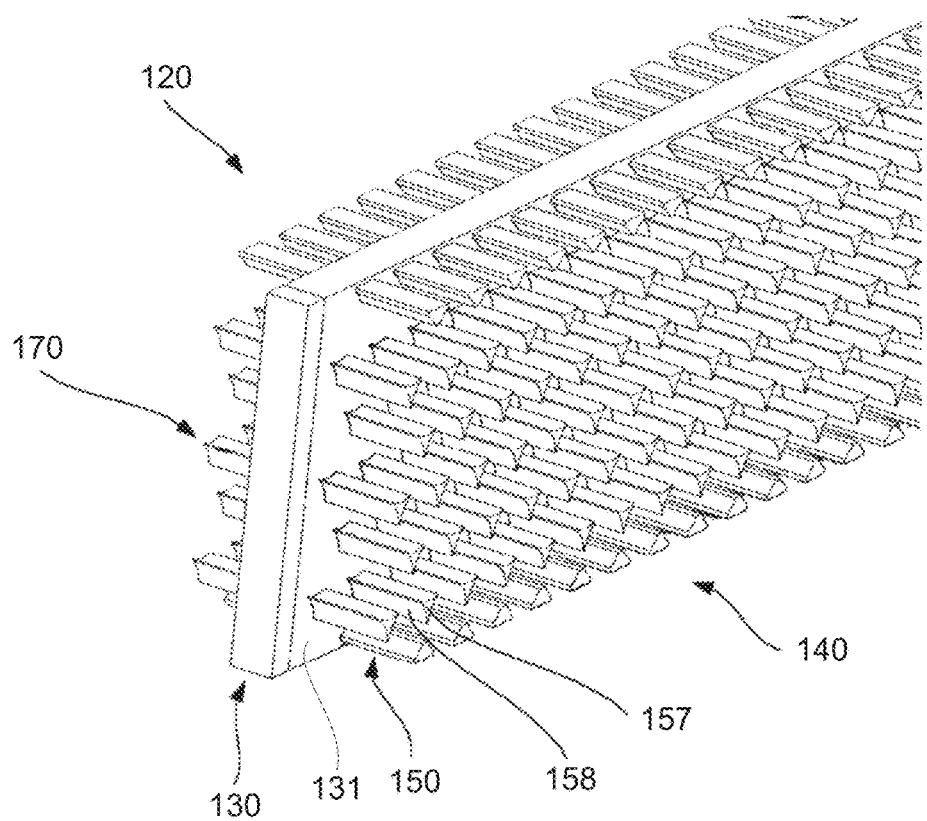

FIG. 9 is a schematic perspective view of a thermal control module, comprising a battery engagement component formed by a plurality of triangular extensions, in accordance with some examples.

Figure 10A:
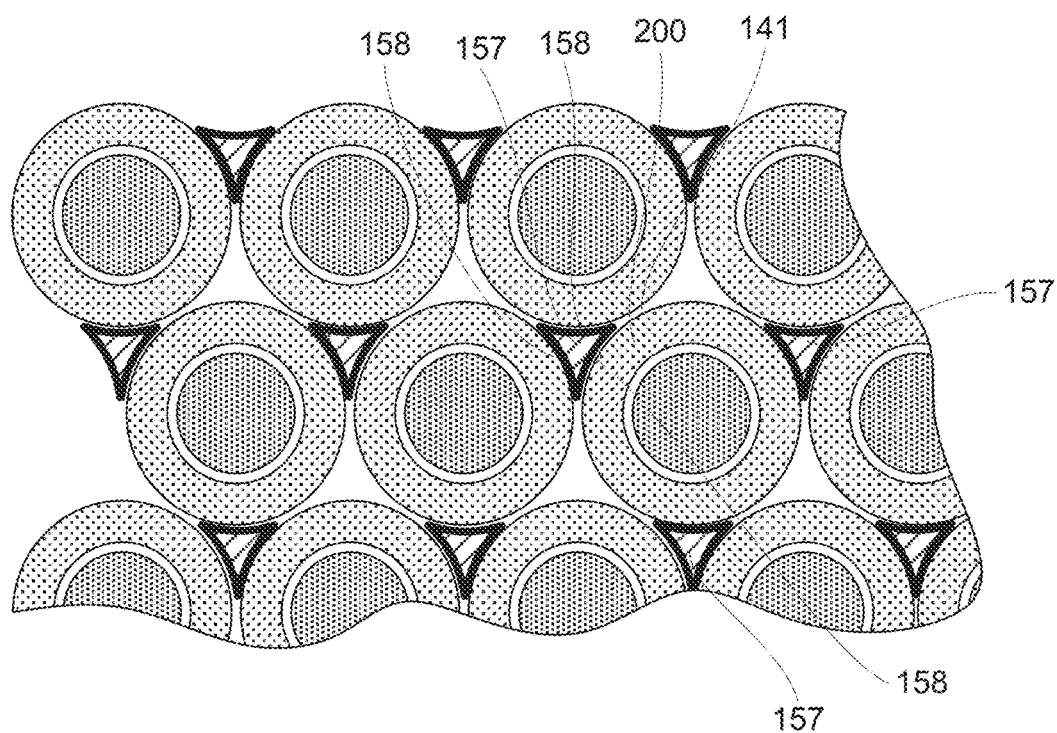

FIG. 10A is a schematic top view of one example of a thermal control module, with a plurality of triangular extensions thermally coupled to batteries.

Figure 10B:
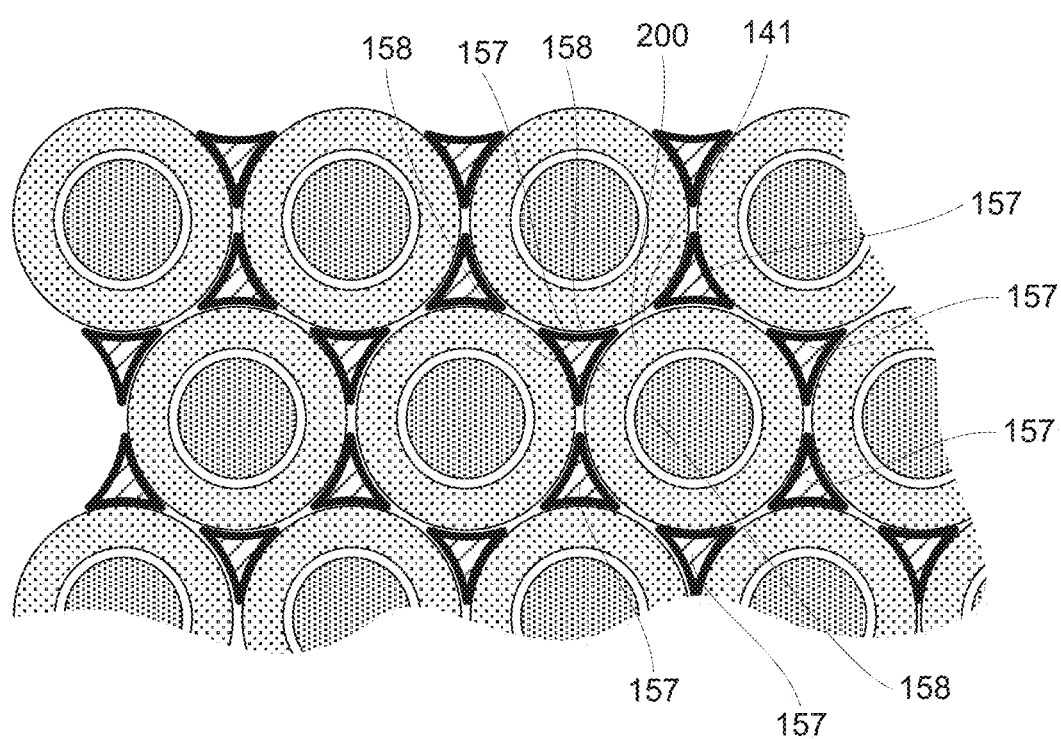

FIG. 10B is a schematic top view of another example of a thermal control module, with a plurality of triangular extensions thermally coupled to batteries, in accordance with some examples.

Figure 10C:
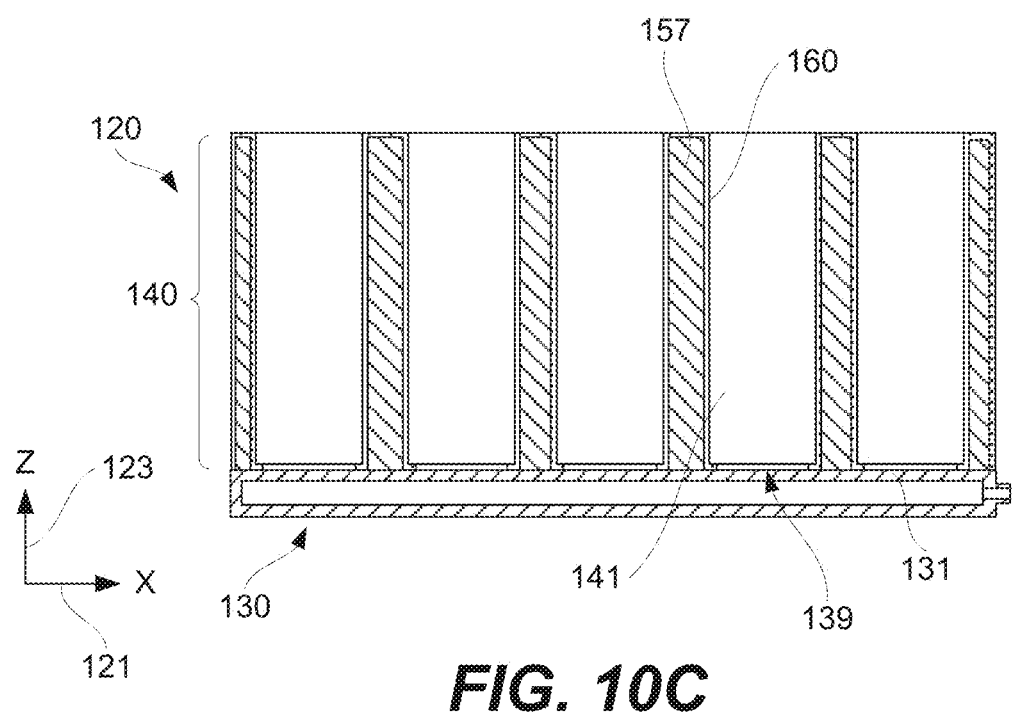

FIG. 10C is a schematic cross-sectional side view of the thermal control module of FIG. 10A, showing a sleeve extending over the plurality of triangular extensions, in accordance with some examples.

Figure 11A:
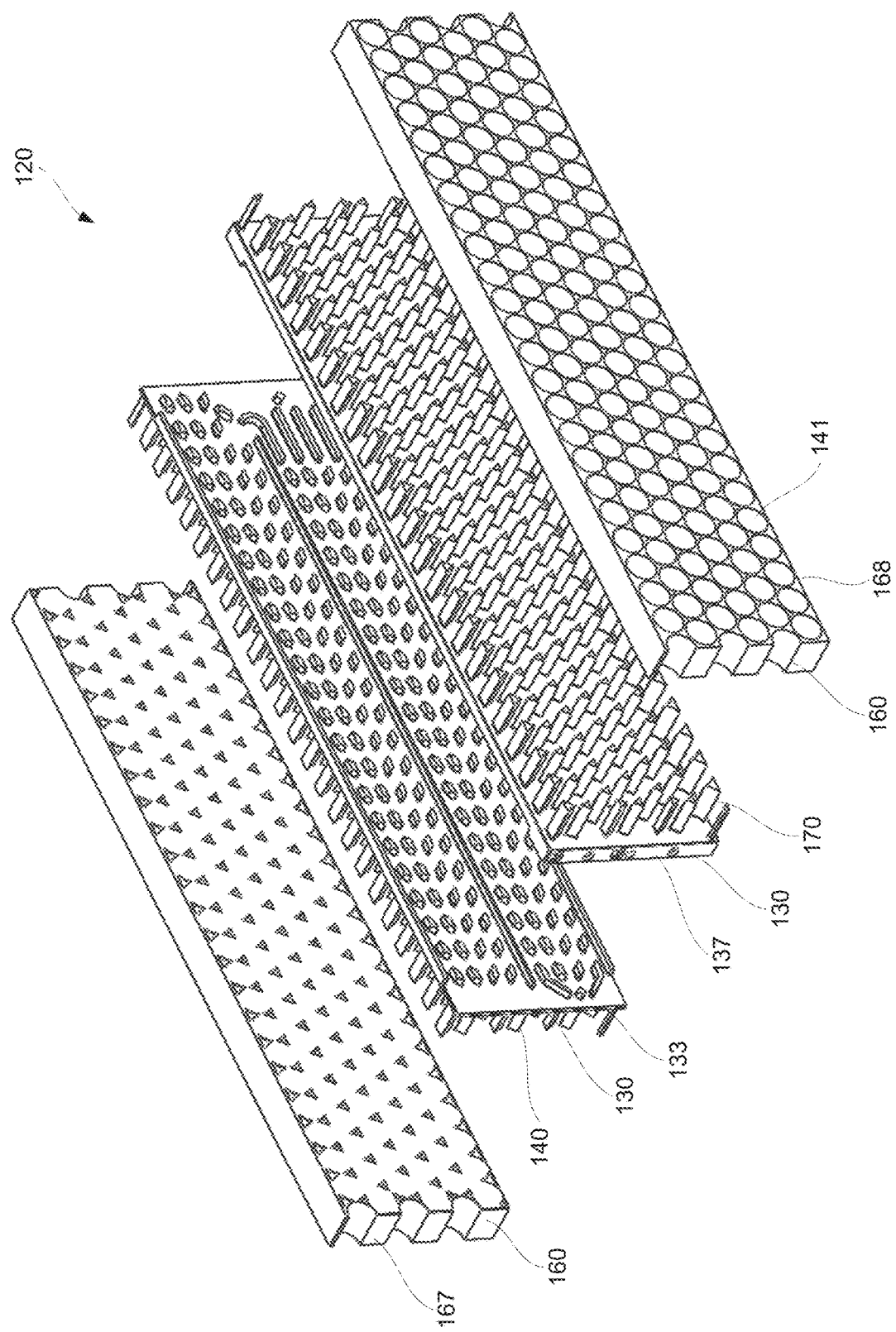

FIG. 11A is a schematic exploded view of a thermal control module, in accordance with some examples.

Figure 11B:
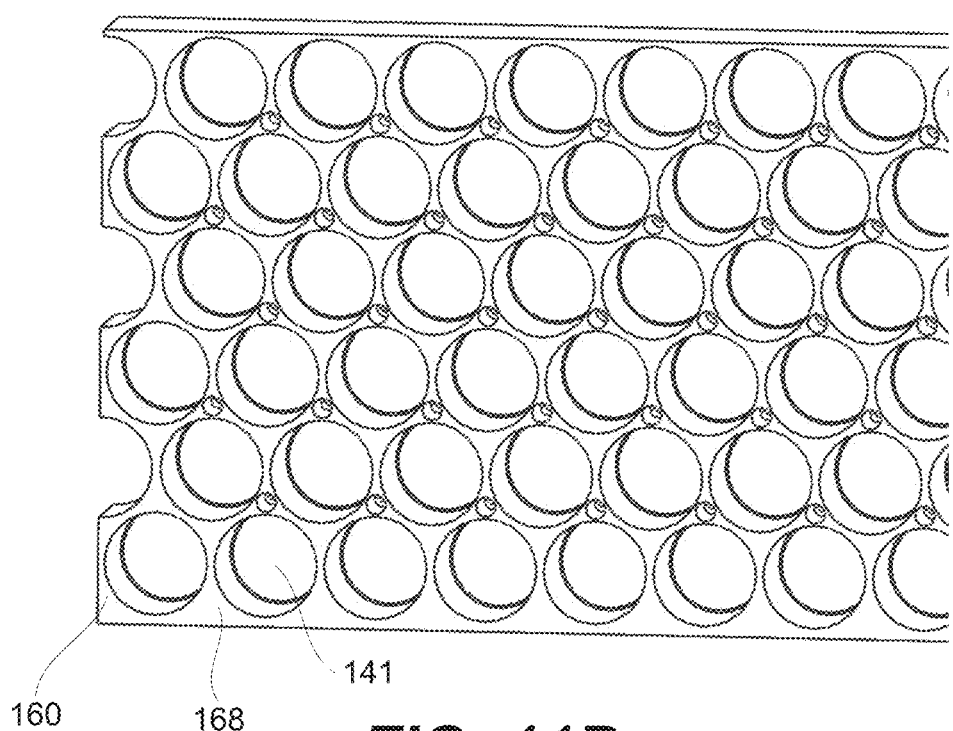
Figure 11C:
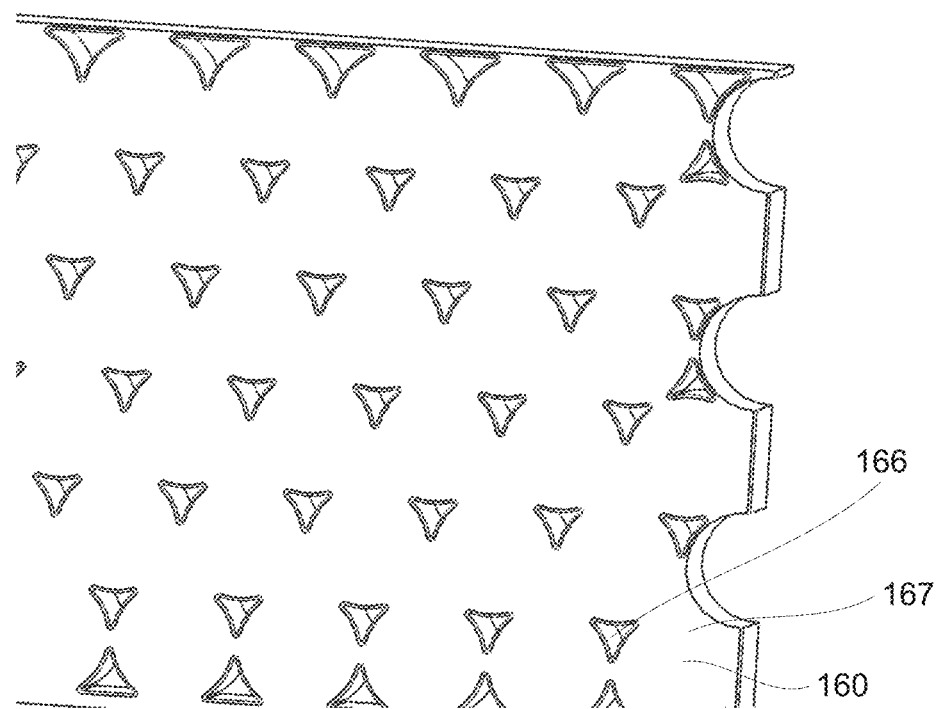

FIGS. 11B and 11C are schematic views of a sleeve of the thermal control module shown in FIG. 11A, in accordance with some examples.

Figure 12:
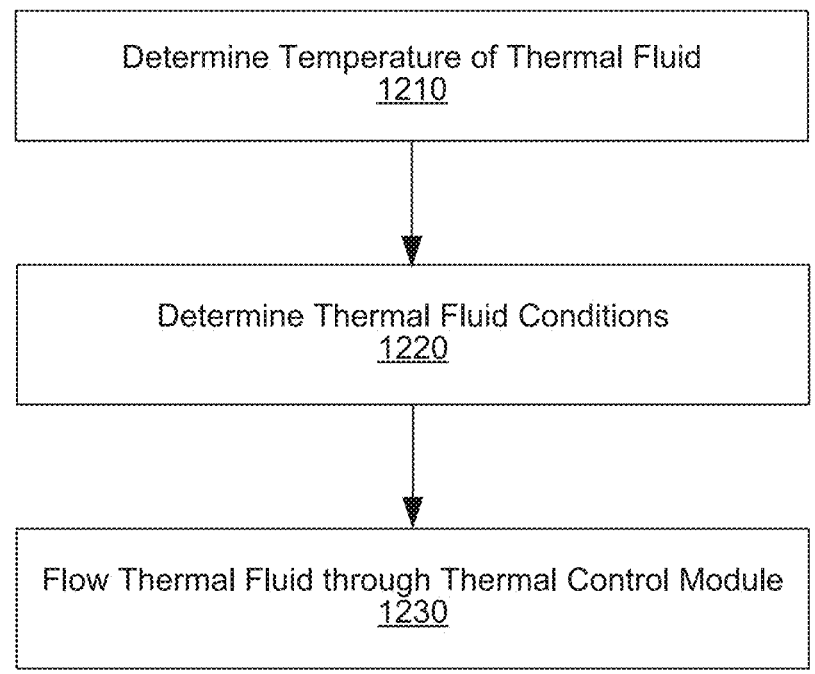

FIG. 12 is a process flowchart corresponding to a method of operating a battery pack comprising a thermal control module, in accordance with some examples.

Figure 13A:
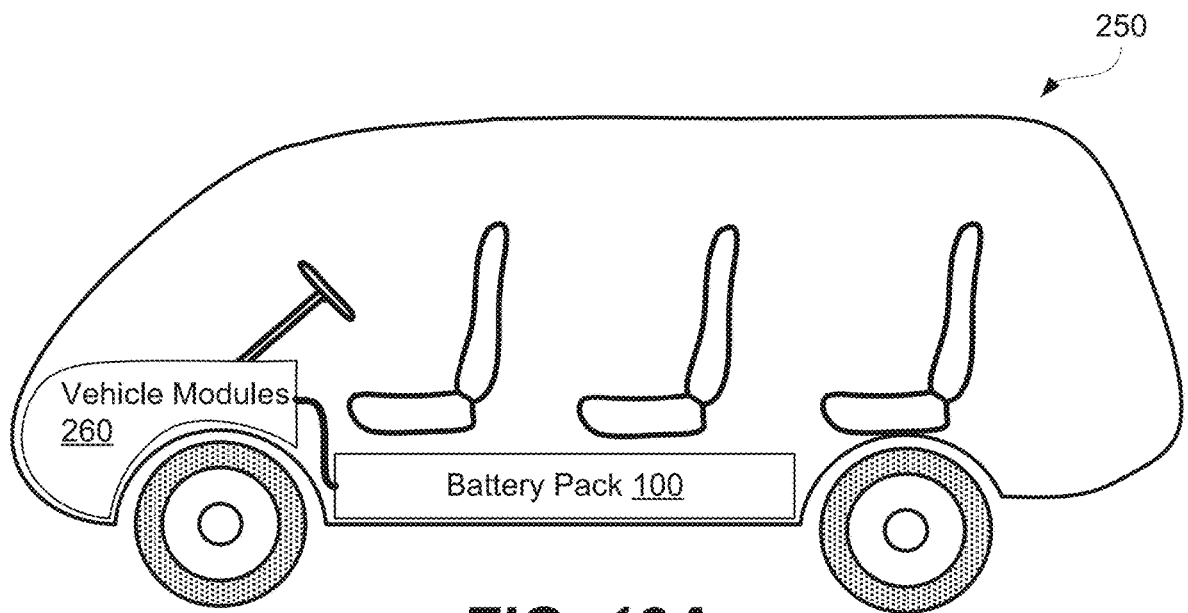
Figure 13B:
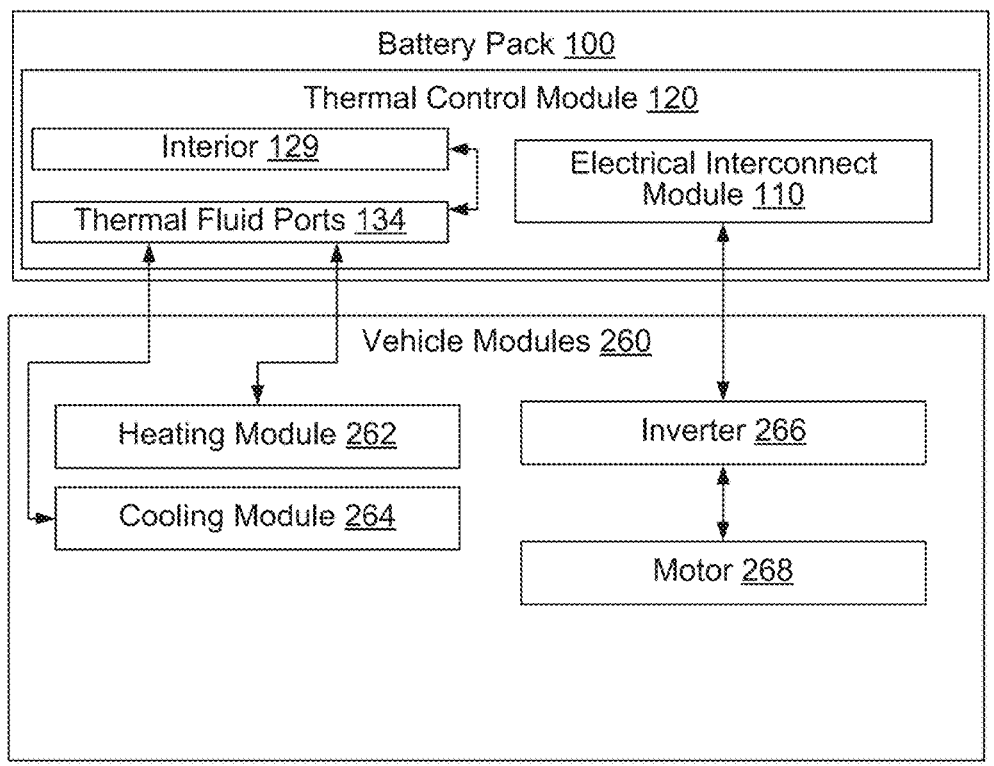

FIGS. 13A and 13B are schematic representations of an electric vehicle comprising a battery back, equipped with a thermal control module, in accordance with some examples.

DETAILED DESCRIPTION

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific examples, it will be understood that these examples are not intended to be limiting.

Reference herein to "one example" or "one aspect" means that one or more feature, structure, or characteristic described in connection with the example or aspect is included in at least one implementation. The phrase "one example" or "one aspect" in various places in the specification may or may not be referring to the same example or aspect.

Introduction

Large battery packs, such as packs having capacities of at least 5 kWh, at least 20 kWh, or larger, are used for many different applications, such as electric vehicles, electrical grid storage/balancing, and the like. Some of these applications are associated with large charge and/or discharge currents passing through the battery pack. For example, large charge currents (e.g., over 100 A, or even over 300 A) may be used to expedite the charging of the battery pack in an electrical vehicle. Similarly, large discharge currents (e.g., over 1000 A) may be used during rapid accelerations of the vehicle. These electrical currents cause heating (e.g., resistive heating) of batteries inside the battery pack due to the internal resistance of these batteries. The generated heat is proportional to the square of the electrical current ($P=I^2 \times R$), which illustrates the significant effect of the current on the heating of the batteries.

At the same time, the performance of lithium-ion batteries as well as other types of batteries is greatly impacted by the temperature of the batteries. The operating temperature range of a battery may depend on active materials used for battery electrodes, electrolyte composition, and overall battery design. Many types of batteries (e.g., nickel cadmium, nickel metal hydride, lithium ion) are designed to operate between about 0° C. and 50° C. For example, charging a lithium ion battery at temperatures below 0° C. may result in irreversible plating of metallic lithium because of limited diffusion at the negative electrode at low temperatures. This lithium plating can result in capacity losses and potentially unsafe conditions. Furthermore, charging a lithium ion battery at temperatures above 50° C., especially for prolonged periods of time, may result in internal gas generation and capacity losses. Overall, environment conditions (e.g., ambient temperature) and operating conditions (charge/discharge currents) impact the battery temperature and, if not managed, can result in temperature going outside of the operating range.

Various thermal management methods have been used for battery packs with different levels of success. Some examples include passive or forced air convection around individual batteries, flooding batteries in dielectric fluids (e.g., oils), extending cooling passages through an array of batteries, and positioning a cooling plate on one side of a battery array. However, air cooling is generally not sufficient, especially for high current applications. Air has a much lower heat transfer coefficient and heat capacity than liquids. Furthermore, flooded cooling, wherein a battery case is in direct contact with a cooling liquid, requires very specific non-conductive liquids to prevent battery shorting through the cooling liquid. Another issue comes from non-uniform flow of cooling liquids through complex paths formed by batteries arranged inside the battery packs. Stagnant fluid with minimal or no flow may cause undesirable hot and cold pockets in the battery pack, which should be avoided. However, flow paths are difficult to control due to the preset design of the batteries (e.g., all batteries having a cylindrical shape and being the same size) and the need to pack as many batteries as possible into a given space (e.g., to maximize the energy density of the battery pack).

Another method involves extending cooling passages through a battery array such that these passages contact side walls of cylindrical batteries. A cooling liquid flows through these cooling passages, while the passages provide heat transfer between the battery side walls and the cooling liquid. However, these passages occupy space significant amount of space inside the battery pack thereby reducing the energy density of the pack. Furthermore, these passages are typically very long and non-straight, which presents various challenges with establishing uniform flow of cooling liquids through these passages. Finally, cooling passages often cannot contact the entire perimeter of battery side walls thereby limiting the thermally coupling between the batteries and the cooling passages.

Another approach involves positioning a cooling plate at one side of a battery array. This approach relies on internal heat transfer with batteries along the height of the batteries. Furthermore, this approach may allow direct heat transfer among batteries through their side walls. Finally, a thermal coupling to a small end of a battery may not provide sufficient heat transfer between this battery and the cooling plate and can cause internal hot zones, e.g., away from the cooling plate.

Provided are methods and systems for thermal management of battery packs, which address various deficiencies of conventional systems, described above. Specifically, a thermal control module is used and specifically configured to thermally couple to at least a portion of the side wall and the bottom end of each battery in a battery pack. For example, an 18650 battery has top and bottom circular ends, each having a surface area of about 254 mm$^2$, and a cylindrical side, having a surface area of about 3673 mm$^2$ (about 14.5 times greater than each of the circular ends). While the bottom end may be beneficial for thermal coupling because of its accessibility and because of the internal heat transfer within the battery, the cylindrical side has a large available surface for heat transfer. Overall, thermally coupling to the side wall, in addition to the bottom end of each battery in the battery pack, provides more uniform heat transfer between the batteries and the thermal control module.

Furthermore, the methods and systems utilize thermal fluids (e.g., liquids, gases, and combinations thereof) as heat carriers. A thermal fluid is flown through a thermal control module without directly contacting any of batteries positioned and thermally coupled to the thermal control module. While the batteries are thermally coupled to the thermal fluid (by the thermal control module), the batteries are physically separated and electrically isolated from the thermal fluid (also by the thermal control module). As such, there are no concerns about the batteries being electrically shortened by the thermal fluid or the thermal fluid causing corrosion of the batteries.

FIG. 1A is a schematic illustration of battery pack 100, in accordance with some examples. Battery pack 100 comprises batteries 200 and electrical interconnect module 110, interconnecting batteries 200. As further described below with reference to FIG. 13B, electrical interconnect module 110 may be connected to various electrical components of a system utilizing battery pack 100. Electrical interconnect module 110 may be connected first and second contacts of each battery 200 in battery pack 100. For example, electrical interconnect module 110 comprises bus bars, contact leads, and other like components to form these electrical connections. Various forms of electrical connections of batteries 200 by electrical interconnect module 110 are within the scope, e.g., individual connection of each battery, parallel connections, in-series connections, various combinations of parallel and in-series connections.

Battery pack 100 also comprises thermal control module 120, thermally coupled to batteries 200 and controlling the temperature of batteries 200 during operation of battery pack 100. For example, thermal control module 120 is used to prevent excessive heating of batteries 200 during rapid charging and/or discharging. In some examples, thermal control module 120 is used for heating batteries 200, e.g., when battery pack 100 is operated in a cold environment. Various examples of thermal control module 120 are further described below.

Battery pack 100 also comprises battery pack controller 195, which controls the operation of one or both electrical interconnect module 110 and thermal control module 120. For example, battery pack controller 195 controls the flow rate (e.g., by controlling the operation of a pump) and/or the temperature of the thermal fluid supplied to thermal control module 120 (e.g., by controlling the operation of a thermostat, heater, pump, and/or other components of the overall system). In some examples, battery pack controller 195 monitors the temperature of the thermal fluid inside thermal control module 120 and/or leaving thermal control module 120. Various operating examples of battery pack controller 195 are described below with reference to FIG. 12.

In some examples, battery pack 100 comprises multiple thermal control modules 120 as, for example, is shown in FIG. 1B. Specifically, FIG. 1B illustrates two thermal control modules 120, each thermally coupled to two arrays of batteries 200, e.g., to bottom ends and side walls of each battery 200 in the two arrays. FIG. 1B also illustrates four electrical interconnect modules 110, each electrically coupled to a separate array of batteries 200, e.g., to top ends of each battery 200.

Referring to FIG. 1A, thermal control module 120 comprises thermal plate 130 and battery engagement component 140, connected and thermally coupled to thermal plate 130. In some examples, thermal plate 130 and battery engagement component 140 are monolithic (e.g., fabricated as one component). Alternatively, thermal plate 130 and battery engagement component 140 are fabricated as separate components and then joined together to form thermal control module 120.

During the operation of thermal control module 120, batteries 200 are positioned within and supported by thermal control module 120. For example, first ends 201, which are sometimes referred to as top ends, of batteries 200 are electrically coupled to electrical interconnect module 110. Battery engagement component 140 is thermally coupled to batteries 200 or, more specifically, to sides 203 of batteries 200. In some examples, second ends 202, which are sometimes referred to as bottom ends, of batteries 200 are thermally coupled to thermal plate 130, either directly or through battery engagement component 140. Alternatively, second ends 202 are also thermally coupled to battery engagement component 140, Battery engagement component 140 is configured to transfer heat between batteries 200 (e.g., sides 203 and, in some examples, second ends 202) and thermal plate 130.

Thermal fluid 109 is circulated through at least thermal plate 130 and either remove heat from thermal control module 120 or add heat to thermal control module 120. In some examples further described below, thermal fluid 109 also circulates through battery engagement component 140. It should be noted that, batteries 200 do not have direct contact with thermal fluid 109, thereby eliminating the risk of electrical shorts among batteries 200 through thermal fluid 109. As such, an electrically conductive thermal fluid may be used in thermal control module 120.

Thermal plate 130 is configured to provide uniform flow of thermal fluid 109 along the entire length (X-axis) of thermal control module 120 thereby eliminating temperature variations /cold and hot spots at least within thermal plate 130. The heat transfer along the height (Z-axis) of thermal control module 120 is provided by battery engagement component 140 and, to some extent, by batteries 200. A brief description of batteries 200 is helpful to understand thermal dynamics inside battery pack 100.

FIG. 2A is a schematic cross-sectional view of battery 200, in accordance with some examples. In these examples, battery 200 is a cylindrical cell, having a wound arrangement of its electrodes. Specific examples of such batteries are 18650, 20700, 21700 and 22700 cells. This battery configuration is simple to manufacture and has good mechanical stability (e.g., able to withstand high internal pressures without deforming). However, other types of batteries, such as prismatic and pouch batteries are also within the scope.

Referring to FIG. 2A, battery 200 comprises first electrode 221, second electrode 222, and electrolyte 224. First electrode 221 and second electrode 222 may be referred to as a negative electrode and a positive electrode or as an anode and a cathode. Electrolyte 224 provides ionic communication/exchange between first electrode 221 and second electrode 222 (e.g., allowing ions to shuttle between first electrode 221 and second electrode 222 during charge and discharge of battery 200).

First electrode 221 and second electrode 222 are electrically insulated from each other. For example, separator 223 may be disposed between first electrode 221 and second electrode 222 to provide physical separation and electrical isolation of first electrode 221 and second electrode 222. Separator 223 comprises pores and is soaked with electrolyte 224, thereby allowing ionic exchange through separator 223.

In some examples, first electrode 221, separator 223, and second electrode 222 are wound into cylindrical structures, often referred to as a "jelly-roll". In other examples, first electrode 221, separator 223, and second electrode 222 are arranged into a stack. First electrode 221, separator 223, second electrode 222, and electrolyte 224 may be referred to as internal components of battery 200.

Battery 200 also comprises case 230 and cover 232, which isolate the internal components from the environment. For example, some internal components may be sensitive to moisture and other environmental conditions. In some examples, case 230 and cover 232 are electrically isolated from each other, e.g., by seal 233 positioned between case 230 and cover 232. In these examples, case 230 is electrically connected to first electrode 221 (e.g., a positive electrode or a cathode), while cover 232 is connected to second electrode 222 (e.g., a negative electrode or an anode). Furthermore, in these examples, case 230 is operable as first contact 211 of battery 200, while cover 232 is operable as second contact 212.

Case 230 and cover 232 form first end 201, second end 202, and side 203 of battery 200. Referring to FIG. 2B, which shows a top view of battery 200, cover 232 forms at least a portion of first end 201 (e.g., an inside portion). Case 230 forms another portion of first end 201 (e.g., an outside rim), As such, both electrical connections to battery 200 can be formed at first end 201 as, for example, shown in FIG. 1A. In other words, first contact 211 and second contact 212 of battery 200 are available at first end 201, at least in this example. As noted above, electrical interconnect module 110 forms electrical connections to first contact 211 and also to second contact 212. When these electrical connections are formed at first end 201, second end 202 and side 203 remain available, e.g., for thermal coupling.

Referring to FIG. 2A, first electrode 221 and second electrode 222 extend along the height (the Z-axis) of battery 200 and are wound around the center axis (coinciding or parallel to the Z-axis) of battery 200. Each of first electrode 221 and second electrode 222 comprises a metal current collector (e.g., a metal foil), which provides good thermal conductivity. Without being restricted to any particular theory, it is believed that the heat transfer, at least within wound cylindrical cell, is higher along its height (along the Z-axis) than along its diameter (along the X-axis and along the Y-axis). Furthermore, first electrode 221 and second electrode 222 are generally positioned closer to second end 202 than to first end 201 due to various design considerations associate with sealing battery 200 as well as providing first contact 211 and second contact 212. As such, second end 202 is an effective thermal coupling location. However, the surface area of second end 202 is generally smaller than that of side 203 (e.g., about 14.5 times greater for 18650-cell as noted above). As such, side 203 is also an effective coupling location. As described below, thermal control module 120 is thermally coupled to both second end 202 and side 203 of each battery 200.

In some examples, battery 200 is a lithium ion battery. In these examples, first electrode 221 comprises a lithium containing material, such as Lithium Cobalt Oxide($LiCoO_2$), Lithium Manganese Oxide ($LiMn_2O_4$), Lithium Nickel Manganese Cobalt Oxide ($LiNiMnCoO_2$ or NMC), Lithium Iron Phosphate($LiFePO_4$), Lithium Nickel Cobalt Aluminum Oxide ($LiNiCoAlO_2$), and Lithium Titanate ($Li_4Ti_5O_{12}$). Second electrode 222 comprises a lithium-getter material, such graphite, silicon, or the like. However, other types of batteries are also within the scope.

Examples of Thermal Control Modules

FIG. 3A is a schematic cross-sectional view of thermal control module 120, in accordance with some examples, prior to installing batteries 200 into thermal control module 120. FIG. 3C is a similar view of thermal control module 120 of FIG. 3A, after installing batteries 200 into thermal control module 120. Once batteries 200 are installed, thermal control module 120 is used for controlling temperature of batteries 200 in battery pack 100.

As noted above, thermal control module 120 comprises thermal plate 130 and battery engagement component 140. Referring to FIG. 3C, battery engagement component 140 is thermally coupled to sides 203 of batteries, while thermal plate 130 is thermally coupled to second end 202, either directly or through a portion of battery engagement component 140. Battery engagement component 140 may be also referred to first battery engagement component 140 to distinguish from second battery engagement component 170, described below with reference to FIG. 3D.

Thermal plate 130 comprises first side 131, extending along first axis 121 (X-axis) and second axis 122 (Y-axis) of thermal control module 120. As shown in FIG. 3B, first axis 12.1 is perpendicular to second axis 122. Thermal plate 130 also comprises second side 132, also extending along first axis 121 and second axis 122 of thermal control module 120. Second side 132 is offset relative to first side 131 along third axis 123 (Z-axis), Third axis 123 is perpendicular to each of first axis 121 and second axis 122. At least one of first side 131 or second side 132 partially defines interior 129 of thermal control module 120. First side 131 and second side 132 may be also referred to as a first wall and a second wall.

FIG. 3A illustrates an example, where first side 131 and second side 132 define top and bottom boundaries of interior 129. In this example, interior 129 is positioned in its entirety within thermal plate 130. However, other examples, where a portion of interior 129 extends to battery engagement component 140, are also within the scope. Some of these other examples are shown FIGS. 4A-4D and described below. Overall, thermal control module 120 is designed such that all or at least most (e.g., at least 50% based on the total flow rate or at least about 75% of the total flow rate or even at least about 90% of the total flow rate) of thermal fluid 190, which is supplied to thermal control module 120, flows though thermal plate 130, If any portion of thermal fluid 190 flows through first battery engagement component 140 and/ or second battery engagement component 170, the flow rate of this portion is less than that through thermal plate 130.

Referring to FIGS. 3A-3C, thermal control module 120 also comprises thermal fluid ports 134, configured to connect to thermal fluid lines and/or other components of the overall system. Thermal fluid ports 134 allow circulation of thermal fluid 109 in and out of thermal control module 120 and through interior 129 of thermal control module 120. FIG. 3B illustrates an example with two thermal fluid ports 134 positioned along the same end of thermal control module 120along the length of thermal control module 120. One thermal fluid port 134 is used to supply thermal fluid 109 to interior 129 and may be referred to as an inlet port. The other thermal fluid port 134 is used to remove thermal fluid 109 from interior 129 and may be referred to as an outlet port. In some examples, the temperature of thermal fluid 109 supplied to and/or removed from thermal control module 120 is monitored at the inlet port and/or the outlet port. The thermal fluid lines may be connected to a pump, a heat exchanger, a heater, a chiller, and other like components for controlling the flow rate and the temperature of thermal fluid 109 flown into interior 129 of thermal control module 120. Some examples of thermal fluid 109 include but are not limited to synthetic oil, water and ethylene glycol, poly-alpha-olefin oil, and the like.

Battery engagement component 140 is thermally coupled and connected to first side 131 of thermal plate 130. In some examples, battery engagement component 140 and thermal plate 130 are monolithic as, for example, is shown in FIG. 3A. Alternatively, battery engagement component 140 and thermal plate 130 are initially formed as separate components and then attached to each other as, for example, is schematically shown in FIG. 5B.

Battery engagement component 140 comprises plurality of battery receiving openings 141, extending along third axis 123 of thermal control module 120. Each of plurality of battery receiving openings 141 is configured to receive one of batteries 200 as, for example, shown in FIG. 3B. A set of batteries 200 received by the same battery engagement component 140 may be referred to as an array of batteries 200. FIG. 3B illustrates a two-dimensional array of batteries 200, extending along first axis 121 (X-axis) and second axis 122 (Y-axis). Adjacent rows of cylindrical batteries may be offset relative to each other to increase battery density. When thermal control module 120 comprises first battery engagement component 140 and second battery engagement component 170, thermal control module 120 is configured to receive and thermally couple two separate arrays of batteries 200 as, for example, is schematically shown in FIG. 3D.

In some examples, the size of battery receiving openings 141 is such that there is a snug fit between battery receiving openings 141 and batteries 200, providing a direct contact and thermal coupling between battery engagement component 140 and batteries 200. For example, the diameter of battery receiving openings 141 may be within 1-5% of the diameter of battery 200, e.g., no more than 5% of the battery diameter or, more specifically, no more than 1%. Furthermore, in some examples, battery receiving openings 141 are formed by a compressible material (e.g., of sleeve 160, further described below) to provide conformal direct contact between battery engagement component 140 and batteries 200.

Furthermore, in some examples, battery engagement component 140 provides mechanical support to batteries 200. For example, battery engagement component 140 retains batteries 200 in designed positioned and maintains the orientation of batteries 200 in thermal control module 120 even when battery pack 100 is subjected to various forces (e.g., flipped upside down), vibration, and the like. Once battery 200 is installed into battery engagement component 140, the force required to remove battery 200 from battery engagement component 140 may be greater than, e.g., the weight of battery 200. Overall, battery engagement component 140 thermally couples batteries 200 to thermal plate 130 (and, in some examples, to thermal fluid 109), electrically insulates batteries 200 from thermal plate 130 and, more specifically, from thermal fluid 109, physically isolates batteries 200 from thermal fluid 109, and, in some examples, mechanically supports batteries 200.

Referring to FIG. 3D, in some examples, thermal control module 120 further comprises second battery engagement component 170, thermally coupled and connected to second side 132 of thermal plate 130. Second battery engagement component 170 comprises second plurality of battery receiving openings 171, extending along third axis 123 of thermal control module 120, Each of second plurality of battery receiving openings 171 is configured to receive one of batteries 200. Second battery engagement component 170 thermally couples this second plurality/second array of batteries 200 to thermal plate 130, electrically insulates batteries 200 from thermal plate 130 and physically isolates batteries 200 from thermal fluid 109. In these examples, battery engagement component 140 may be referred to as first battery engagement component 140, in order to distinguish it from second battery engagement component 170. Alternatively, thermal control module 120 comprises only one battery engagement component 140.

In some examples, interior 129 is only disposed within thermal plate 130. As such, the thermal fluid is flown only within thermal plate 130 as, for example, shown in FIG. 3C. In other words, interior 129 of thermal control module 120 does not extend into battery engagement component 140, and the thermal fluid does flow through battery engagement component 140. The heat transfer between sides 203 of batteries 200 and thermal plate 130 is provided by the thermal conductivity of one or more materials forming battery engagement component 140. It should be noted that the thermal conductivity of batteries 200 is also relied on for heat transfer along third axis 123 (Z-axis) during operation of battery pack 100.

Alternatively, battery engagement component 140 may comprise plurality of engagement module flow channels 145 as, for example, is shown in FIGS. 4A-4C. Engagement module flow channels 145 are disposed in between adjacent ones of plurality of battery receiving openings 141 and form a portion of interior 129 of thermal control module 120. At the same time, engagement module flow channels 145 are fluidically isolated from battery receiving openings 141 such that the thermal fluid, provided in engagement module flow channels 145, does not come in direct contact with batteries 200.

In more specific examples shown in FIGS. 4A and 4B, first side 131 of thermal plate 130 comprises a plurality of thermal plate openings 320. Each thermal plate opening 320 may be aligned and in fluid communication with one of engagement module flow channels 145, This alignment feature provides fluidic communication between a portion of interior 129 formed by thermal plate 130 and a portion of interior 129 formed by battery engagement component 140. As such, the thermal fluid can flow between these portions during operation of thermal control module 120 or, more generally, during operation of battery pack 100. For example, the portion of interior 129 formed by thermal plate 130 may provide the main path for the thermal fluid within thermal control module 120. The fluid thermal enters, flows within, and exists individual engagement module flow channels 145 thereby providing convection thermal transfer within battery engagement component 140, in addition to conductive thermal transfer provided by the material forming battery engagement component 140.

Referring to FIGS. 4A-4B, in some examples, engagement module flow channels 145 is in fluidic communication with a portion of interior 129 within thermal plate 130. This interior portion is positioned between first side 131 and second side 132. As noted above, this interior portion (within thermal plate 130) provides the primary path for the thermal fluid, at least along first axis 121 (X-axis) and second axis 122 (Y-axis). This interior portion also sends some thermal fluid into extension fluid channels 155 thereby establishing convective heat transfer along third axis 123 (Z-axis) when the thermal fluid flows within extension fluid channels 155. In some examples, engagement module flow channels 145 may not be directly connected with each other, Instead, each engagement module flow channels 145 receives and discharges the thermal fluid into this portion of interior 129.

Alternatively, as for examples shown in FIG. 4C, engagement module flow channels 145 are isolated from with this portion of interior 129, positioned between first side 131 and second side 132. Instead, extension fluid channel 155 extends at least along first axis 121 and comprises extension fluid ports 156. As such, interior 129 may be formed by two separate portions, one within thermal plate 130 and one within thermal extension 150. These separate interior portions may not be in fluidic communication with each other, at least directly. Fluidic separation of these portions allows for independent flow control of the thermal fluid in each portion, providing additional level of the overall process control.

Referring to FIG. 5A, in some examples, battery engagement component 140 comprises thermal extension 150 and sleeve 160. In these examples, the primary function of thermal extension 150 may be mechanical support to batteries 200 and to sleeve 160 as well as the heat transfer, while the primary function of sleeve 160 may be electrical isolation of batteries 200 from thermal extension 150. The addition of sleeve 160 to thermal extension 150 allows using various electrically conductive materials for thermal extension 150, such as metals or, more specifically, copper, aluminum, and the like. These materials have high thermal conductivity.

Sleeve 160 is formed from a thermally-conductive polymer or coating, which is electrically insulating. Some examples of materials suitable for sleeve 160 are polymers with non-conductive ceramic filers, e.g., boron nitride and aluminum nitride. In some examples, the thermal conductivity of a material forming sleeve 160 is at least about 0.5 W/mK or even at least about 2 W/mK. The electrical conductivity of a material forming sleeve 160 is less than $10^{-10}$ S/m or even less than $10^{-15}$ S/m.

Sleeve 160 forms at least a portion of each battery receiving opening 141. As such, in some examples, when batteries 200 are installed into thermal control module 120, only sleeve 160 (out of components of thermal control module 120) contacts batteries 200. Sleeve 160 electrically insulates thermal extension 150 from batteries 200, thereby preventing shortening of batteries 200 by thermal extension 150. At the same time, sleeve 160 thermally couples thermal extension 150 to batteries 200, thereby providing a thermal path from batteries 200 to thermal extension 150. In some examples, the thickness of sleeve 160 is between about 0.5 mm and 5 mm or, more specifically, between 1 mm and 3 mm.

Referring to FIG. 5A, sleeve 160 may extend to thermal plate 130 and, in some examples, form the bottom of each battery receiving opening 141. In these examples, sleeve 160 also electrically insulates batteries 200 from thermal plate 130, which allows forming thermal plate 130 from electrically conductive materials, such as metals or, more specifically, copper, aluminum, and the like.

Also, referring to FIG. 5A, thermal extension 150 directly interfaces first side 131 of thermal plate 130 thereby providing direct thermal transfer and mechanical support between thermal extension 150 and thermal plate 130. In some examples, thermal extension 150 is welded, braised, soldered, or otherwise attached to thermal plate 130. Alternatively, thermal extension 150 is monolithic with thermal plate 130, e.g., formed from the same initial block of material.

Referring to FIG. 5B, in some examples, battery engagement component 140 and thermal plate 130 are made from different components and later joined together to form thermal control module 120. For example, battery engagement component 140 may be formed from a thermally conductive polymer, while thermal plate 130 is formed from a metal. Various examples of suitable thermally conductive polymers are listed above.

Various examples and features of thermal plate 130 will now be described with reference to FIGS. 6A-6E. In the illustrated example, first portion 133 of thermal plate 130 is monolithic with first battery engagement component 140, while second portion 137 of thermal plate 130 is monolithic with second battery engagement component 170. For example, first portion 133 of thermal plate 130 and first battery engagement component 140 are fabricated as a single component, which is then joined together with second portion 137 of thermal plate 130 and second battery engagement component 170, e.g., during assembly of thermal control module 120, e.g., welded, braised, soldered, or otherwise attached. However, various features of thermal plate 130, which are shown and described with reference to FIGS. 6A-6E, are also applicable to other integration examples of thermal plate 130 and one or more battery engagement components, which are described above.

As noted above, thermal plate 130 forms at least a portion of interior 129 of thermal control module 120. Furthermore, thermal plate 130 is the main carrier of thermal fluid 109 in thermal control module 120 or, in some examples, the only carrier of thermal fluid 109. Thermal plate 130 also supports and is thermally coupled to one or two battery engagement components (or integrated with one or two battery engagement components).

Referring to FIG. 6A, in some examples, thermal plate 130 comprises a plurality of diffusers 135 disposed within interior 129 or at least a portion thereof. Diffusers 135 are supported by at least one of first side 131 or second side 132. Diffusers 135 are configured to redirect the thermal fluid within interior 129 thereby ensuring the uniform flow of the thermal fluid and avoiding cold and hot spots, associated with the stagnant or excessively fast-slowing thermal fluid. Diffusers 135 are configured to redirect the thermal fluid flowing along first axis 121 (X-axis) at least along second axis 122 (Y-axis). It should be noted that the main flowing direction of the thermal fluid within interior 129 is along first axis 121 (X-axis).

In some examples, diffusers 135 extend between and contacts each of first side 131 and second side 132 as, for examples, is shown in FIG. 6B. For example, diffusers 135 may be attached to or monolithic with one of first side 131 or second side 132 and contact the other side. In these examples, diffusers 135 act as heat spreaders between first side 131 and second side 132 thereby ensuring temperature uniformity within interior 129, in addition to the thermal fluid. Furthermore, diffusers 135 may provide mechanical support to first side 131 and second side 132 (e.g., relative to each other such as transfer forces between first side 131 and second side 132). This feature allows forming first side 131 and second side 132 with thinner walls thereby reducing the weight and improving thermal transfer of thermal control module 120, Referring to FIG. 6C, in some examples, each of plurality of diffusers 135 comprises diffusing surface 310, having an acute angle relative to first axis 121. Diffusing surface 310 is configured to redistribute the thermal fluid within the X-Y plane, e.g., redirects the thermal fluid flowing along first axis 121 (X-axis).

In some examples, thermal plate 130 comprises divider 136, extending along third axis 123 (Z-axis) as, for example, shown in FIGS. 6D and 6E. When thermal plate 130 is assembled, divider 136 extends between first side 131 and second side 132. Furthermore, divider 136 extends, along first axis 121 (X-axis), most of the thermal plate length. Specifically, divider 136 extends to the edge of thermal plate 130 containing the thermal fluid ports 134, but not to the opposite edge, thereby creating a gap with the opposite edge. Divider 136 separates at least a portion of interior 129 (within thermal plate 130) into first part 331 and second part 332. This separation prevents the thermal fluid to transfer between first part 331 and second part 332, other than through the gap between divider 136 and the opposite edge of thermal plate 130, thereby forcing the thermal fluid to travel the entire length of thermal plate 130.

One of thermal fluid ports 134, e.g., an inlet, is in fluidic communication with first part 331, while another one of thermal fluid ports 134, e.g., an outlet, is in fluidic communication with second part 332. As such, when the thermal fluid is supplied through the inlet into first part 331, the thermal fluid flows through first part 332 the entire length of thermal plate 130 before returning back, through the gap between divider 136 and the opposite edge, to the outlet. During this return, the thermal fluid flows through second part 332, also the entire length of thermal plate 130. Overall, divider 136 ensures that the thermal fluid reaches various parts of interior 129.

Referring to FIGS. 7A and 7C, in some examples, thermal extension 150 comprises first extension portion 151 and second extension portion 152, both extending along first axis 121 of thermal control module 120. First extension portion 151 and second extension portion 152 may be individual components, independently connected to thermal plate 130. First extension portion 151 and second extension portion 152 form extension channel 153, between first extension portion 151 and second extension portion 152. In these examples, some battery receiving openings 141 are positioned within extension channel 153.

Sleeve 160 extends into channel 153 and prevents at least direct contact between the batteries and thermal fluid. As shown in FIGS. 7A and 7B, sleeve 160 comprises first sleeve portion 161, disposed in extension channel 153 and attached to first extension portion 151. Sleeve 160 also comprises second sleeve portion 162, disposed in extension channel 153 and attached to second extension portion 152. In this example, first extension portion 151 and second extension portion 152 provide support to first sleeve portion 161 and second sleeve portion 162, respectively. First sleeve portion 161 and second sleeve portion 162 are optional and, in some examples, the thermal fluid directly contacts first extension portion 151 and second extension portion 152 of thermal extension 150.

Referring to FIGS. 7A-7C, in some examples, sleeve 160 comprises third sleeve portion 163, forming battery receiving openings 141. In these examples, sleeve fluid channel 165 extends between third sleeve portion 163 and each of first sleeve portion 161 and second sleeve portion 162. Sleeve fluid channel 165 is a specific example of module flow channels 145. In more specific examples, shown in FIG. 7B, sleeve 160 further comprises fourth sleeve portion 164, attached to first side 131 of thermal plate 130. Sleeve fluid channel 165 extends between third sleeve portion 162 and fourth sleeve portion 164.

Furthermore, extension channel 153 comprises bridging portion 199, disposed and extending between two adjacent battery receiving openings 141 as, for example, schematically shown in FIGS. 7C and 7D. Bridging portion 199 allows positioning sleeve 160 that is continuous (at least within each extension channel 153). The same sleeve may extend along the length of battery engagement component 140, within each extension channel 153, and define multiple battery receiving openings 141. Furthermore, bridging portion 199 may be used to access sides 203 of batteries 200 during installation and removal of batteries 200 from thermal control module 120.

Referring to FIG. 7D, in some examples, thermal extension 150 comprises extension fluid channel 155, configured to receive the thermal fluid. Extension fluid channel 155 is specific examples of module flow channels 145. Providing the thermal fluid within thermal extension 150 helps with heat transfer between batteries 200 and the thermal fluid. Specifically, without extension fluid channels 155 (and also without sleeve fluid channels 165), the only heat transfer from the sides of batteries 200 to thermal plate 130 is conductive heat transfer provided by the material, forming thermal extension 150. Extension fluid channel 155 also adds convective heat transfer when the thermal fluid flows within extension fluid channel 155.

Referring to FIG. 8A, width 154 of extension channel 153, measured along second axis 122 (the Y-axis) of thermal control module 120, may be variable. In other words, the measurements of width 154 differ at different positions within extension channel 153, along first axis 121 (the X-axis). Specifically, extension channel 153 comprises a plurality of channel openings 198, each corresponding to one of the plurality of battery receiving openings 141. Two adjacent channel openings 198 are separated by bridging portion 199. Bridging portion 199 has a smaller width than channel openings 198. In some examples, width 154 of extension channel 153 has the highest value at channel openings 198 or, more specifically, at the center of each channel opening 198. Varying width 154 of extension channel 153 allows increasing thermal coupling between battery engagement component 140 and batteries 200. Specifically, the interface area (either directly or through sleeve 160) between battery engagement component 140 and batteries 200 is increased when channel openings 198 have the same shape as batteries 200, e.g., the circular shape within the X-Y cross-section. For example, the interface portion between battery engagement component 140 and each battery 200 may represent between about 50% and 90% of the side surface area of each battery 200 or, more specifically, between about 60% and 80%.

Referring to FIGS. 8A and 8B, in some examples, sleeve 160 comprises a plurality of sleeve cups 169, separated from each other. Each sleeve cup 169 is inserted into one of plurality of channel openings 198. Once inserted, each sleeve cup 169 defines one of plurality of battery receiving openings 141. In some examples, sleeve cup 169 is first installed onto battery 200. Then, this assembly, including battery 200 and sleeve cup 169, is inserted as a unit into one of channel openings 198. This feature simplifies fabrication of sleeve 160 as well as installation of sleeve 160, Referring to FIG. 9, in some examples, thermal extension 150 comprises plurality of triangular extensions 157, each connected or otherwise integrated to first side 131 of thermal plate 130. At least three triangular extensions 157 define each battery receiving opening 141 as, for example, is shown in FIG. 10A. In this example, battery 200, positioned into battery receiving opening 141 is in thermal communication with three triangular extensions 157. Furthermore, the bottom end of battery 200 may be in direct thermal communication with first side 131 of thermal plate 130, FIG. 10B illustrates an example, in which six triangular extensions 157 define each battery receiving opening 141. Specifically, FIG. 10B illustrates battery 200, positioned in battery receiving opening 141 and in thermal communication with all six triangular extensions 157. It should be also noted that some triangular extensions 157, may each define multiple battery receiving openings 141 and may be thermally coupled to multiple batteries 200. For example, triangular extension 157, identified with an arrow in FIG. 10B, is thermally coupled to three batteries 200, Referring to FIGS. 10A and 10B, in some examples, each of plurality of triangular extensions 157 has at least two curved sides 158. In more specific examples, each of plurality of triangular extensions 157 has three curved sides 158. Each curved side 158 is configured to conform to side 203 of battery 200. In some examples, the curvature radius of each of at least two curved side 158 of each of plurality of triangular extensions 157 is between 1-10% greater than radius of each of batteries 200.

Referring to FIG. 10C, in some examples, sleeve 160 fully covers each of plurality of triangular extensions 157. Furthermore, sleeve 160 may at least partially extend to first side 131 of thermal plate 130, thereby forming a sleeve spacer in each of plurality of battery receiving opening 141. The sleeve spacer prevents direct contact between thermal plate 130 and battery 200 when battery 200 is installed into battery receiving opening 141. More specifically, first side 131 of thermal plate 130 comprises plurality of exposed portions 139. Exposed portions 139 is not covered by sleeve 160. It should be noted that a portion of sleeve 160 may cover a portion of first side 131. Exposed portions 139 are positioned between these covered portions.

FIG. 11A is a schematic exploded view of thermal control module 120, in accordance with some examples. Similar to the example described above with reference to FIG. 6A, in this example, thermal plate 130 comprises first portion 133 and second portion 137. Each of these portions comprises triangular extensions 157 and a corresponding sleeve block, which is inserted onto triangular extensions 157. Specifically, the overall sleeve 160 of thermal control module 120 comprises first sleeve block 167, which is inserted onto triangular extensions 157 of first portion 133, when thermal control module 120 is assembled, and second sleeve block 168, which is inserted onto triangular extensions 157 of second portion 137. Each of these sleeve blocks comprises plurality of battery receiving openings 141 as, for example, more clearly shown in FIG. 11B. Battery receiving openings 141 are open on top surfaces of the sleeve blocks, which face away from thermal plate 130. In some examples, battery receiving openings 141 are open on top surfaces of the sleeve blocks, which face away from thermal plate 130. The bottom of each battery receiving openings 141 may be formed by the corresponding sleeve block to prevent direct contact between batteries 200 and thermal plate 130. Furthermore, each of these sleeve blocks comprises plurality of extension receiving openings 166 as, for example, more clearly shown in FIG. 11C. Triangular extensions 157 extend into extension receiving openings 166, when thermal control module 120 is assembled.

Operating Examples

FIG. 12 is a process flowchart corresponding to method 1200 of operating of battery pack 100, comprising thermal control module 120, in accordance with some examples. Various examples of thermal control module 120 are described above. Some operations of method 1200 may be performed by battery pack controller 195.

Method 1200 may commence with determining the temperature of the thermal fluid (block 1210). The temperature of the thermal fluid is representative of the battery temperature because of thermal coupling between batteries 200 and the thermal fluid, provided by thermal control module 120. The temperature of the thermal fluid may be measured inside thermal control module 120 (e.g., a thermocouple positioned within interior 129) or at one of thermal fluid ports 134, e.g., an exit thermal fluid port. This temperature determining operation may be performed continuously during operation of battery pack 100.

Method 1200 may proceed with determining thermal fluid conditions (block 1220). Some examples of these conditions are one or more flow rates of the thermal fluid through thermal control module 120 (or, more specifically, through individual components of thermal control module 120 when the thermal fluid is independently directed through multiple components) and the temperature of the thermal fluid supplied into thermal control module 120. In some examples, these thermal fluid conditions are determined based on the temperature of the thermal fluid determined during the operation discussed above and represented by block 1210. Furthermore, these thermal fluid conditions may be determined based on electrical operating conditions associated with battery pack 100. For example, if a high current is being passed through battery pack 100 (e.g., during its charge or discharge) or will be passed in near future, the thermal fluid conditions may be adjusted preemptively, e.g., even before the outgoing thermal fluid temperature reflects these electrical operating conditions.

Method 1200 also involves flowing the thermal fluid through thermal control module 120 (block 1230). This operation is performed in accordance with the thermal fluid conditions determined during the operation discussed above and represented by block 1220. Either battery pack 100 or a facility (e.g., an electrical vehicle) where battery pack 100 is installed may be equipped with various components, such as a pump, a heater, and/or a chiller for pumping, heating, and/or cooling the thermal fluid before supplying the thermal fluid to thermal control module 120. These components may form a continuous loop with thermal control module 120 such that the thermal fluid, existing thermal control module 120, is heated or cooled and pumped back into thermal control module 120. These components may be controlled by battery pack controller 195 and may be used for other operations, e.g., such as heating or cooling the interior of an electrical vehicle.

Electric Vehicle Examples

Some examples of thermal control module 120 and battery pack 100, comprising one or more thermal control modules 120, can be deployed in electric vehicles or, more specifically, hybrid electric vehicles, plug-in hybrid electric vehicles, and all-electric vehicles. For example, FIGS. 13A and 13B are schematic illustration of electric vehicle 250, which comprises battery pack 100 and vehicle modules 260. Some examples of vehicle modules 260 are heating module 262, cooling module 264, inverter 266, and motor 268 as, for example, schematically shown in FIG. 13B. Heating module 262 and/or cooling module 264 may be used for heating and cooling of the interior of electric vehicle 250. In some examples, heating module 262 and/or cooling module 264 is fluidically coupled to thermal fluid ports of thermal control module 120, provided in battery pack 100. The heating fluid is controllably pumped between interior 129 of thermal control module 120 and one or both of heating module 262 and/or cooling module 264. As such, heating module 262 and cooling module 264 may be used for controlling the temperature of the thermal fluid. Inverter 266 and motor 268 may be coupled to electrical interconnect module 110 of battery pack 100, such that battery pack 100 is configured to supply and receive the electrical power to/from inverter 266 and motor 268. In some examples, battery pack 100 also supplies electrical power to heating module 262 and/or cooling module 264.

Further Examples

Further, the description includes examples according to the following clauses:

Clause 1. Thermal control module 120 for controlling temperature of batteries 200 in battery pack 100, thermal control module 120 comprising:
thermal plate 130, comprising:
first side 131, extending along first axis 121 and second axis 122 of thermal control module 120, wherein first axis 121 is perpendicular to second axis 122;
second side 132, extending along first axis 121 and second axis 122 of thermal control module 120 and being offset relative to first side 131 along third axis 123, perpendicular to each of first axis 121 and second axis 122, wherein at least one of first side 131 or second side 132 at least partially defines interior 129 of thermal control module 120;
thermal fluid ports 134, configured to connect to thermal fluid lines and flow thermal fluid 109 in and out of interior 129 of thermal control module 120; and
first battery engagement component 140, thermally coupled and attached to first side 131 of thermal plate 130 and comprising plurality of battery receiving openings 141, extending along third axis 123 of thermal control module 120,
wherein each of plurality of battery receiving openings 141 is configured to receive one of batteries 200, such that first battery engagement component 140 thermally couples batteries 200 to thermal plate 130, electrically insulates batteries 200 from thermal plate 130, and fluidically isolates batteries 200 from thermal fluid 109.

Clause 2. Thermal control module 120 of clause 1, wherein:
thermal plate 130 comprises plurality of diffusers 135 disposed within interior 129 and supported by at least one of first side 131 or second side 132,
plurality of diffusers 135 are configured to redirect thermal fluid through interior 129 at least along second axis 122.

Clause 3. Thermal control module 120 of clause 2, wherein each of plurality of diffusers 135 extends between and contacts each of first side 131 and second side 132.

Clause 4. Thermal control module 120 of any one of clauses 2 3, wherein each of plurality of diffusers 135 comprises a diffusing surface 310, having an acute angle relative to first axis 121.

Clause 5. Thermal control module 120 of clause 4, wherein the acute angle differs for at least two of the plurality of diffusers (135).

Clause 6. Thermal control module 120 of any one of clauses 1-5, wherein:
first battery engagement component 140 comprises plurality of engagement module flow channels 145, disposed among plurality of battery receiving openings 141, such that plurality of engagement module flow channels 145 are fluidically isolated from plurality of battery receiving openings 141,
first side 131 comprises plurality of thermal plate openings 320, each being aligned and in fluid communication with one of plurality of engagement module flow channels 145 such that plurality of engagement module flow channels 145 form portion of interior 129 of thermal control module 120, Clause 7. Thermal control module 120 of clause 6, wherein thermal plate 130 comprises plurality of diffusers 135, each being aligned with one of plurality of thermal plate openings 320 and configured to direct thermal fluid into one of plurality of thermal plate openings 320.

Clause 8. Thermal control module 120 of any one of clauses 1-7, wherein:
thermal plate 130 comprises divider 136, extending along third axis 123 between first side 131 and second side 132 also along first axis 121 thereby separating at least a portion of interior 129 into first part 331 and second part 332,
one of thermal fluid ports 134 is in fluidic communication with first part 331, and
another one of thermal fluid ports 134 is in fluidic communication with second part 332.

Clause 9. Thermal control module 120 of any one of clauses 1-8, wherein both of thermal fluid ports 134 are positioned on the same end of thermal plate 130 along first axis 121.

Clause 10. Thermal control module 120 of any one of clauses 1-9, wherein:
first battery engagement component 140 comprises thermal extension 150 and sleeve 160,
thermal extension 150 is formed from a metal,
sleeve 160 is formed from a thermally-conductive polymer or a thermally conductive coating, and
sleeve 160 forms at least a portion of each of plurality of battery receiving openings 141.

Clause 11. Thermal control module 120 of clause 10, wherein thermal extension 150 comprises first extension portion 151 and second extension portion 152, both extending along first axis 121 of thermal control module 120 and forming extension channel 153 between first extension portion 151 and a second extension portion 152.

Clause 12. Thermal control module 120 of clause 11, wherein extension channel 153 extends to and at least partially formed by first side 131 of thermal plate 130.

Cause 13. Thermal control module 120 of clause 12, wherein width 154 of extension channel 153, measured along second axis 122 of thermal control module 120, is variable.

Clause 14. Thermal control module 120 of clause 12, wherein extension channel 153 comprises plurality of channel openings 155, each defining one of plurality of battery receiving openings 141 and each having the diameter corresponding to the highest value of to width 154 of extension channel 153.

Clause 15. Thermal control module 120 of clause 14, wherein:

sleeve 160 comprises plurality of sleeve cups 169, separated from each other; and each of plurality of sleeve cups 169 is inserted into one of plurality of channel openings 155 and defining one of plurality of battery receiving openings 141.

Clause 16. Thermal control module 120 of clause 10, wherein thermal extension 150 comprises extension fluid channel 155, configured to receive thermal fluid.

Clause 17. Thermal control module 120 of clause 16, wherein extension fluid channel 155 is in fluidic communication with a portion of interior 129 positioned between first side 131 and second side 132.

Clause 18. Thermal control module 120 of clause 16, wherein extension fluid channel 155 is isolated from with a portion of interior 129 positioned between first side 131 and second side 132, and wherein extension fluid channel 155 extends along first axis 121, and comprises extension fluid ports 156.

Clause 19. Thermal control module 120 of any one of clauses 10-18, wherein thermally-conductive polymer of sleeve 160 comprises ceramic filler.

Clause 20. Thermal control module 120 of any one of clauses 10-19, wherein sleeve 160 entirely forms each of plurality of battery receiving openings 141.

Clause 21. Thermal control module 120 of any one of clauses 10-20, wherein sleeve 160 comprises first sleeve portion 161 and second sleeve portion 163, forming a sleeve fluid channel 165, configured to receive thermal fluid.

Clause 22. Thermal control module 120 of clause 21, wherein sleeve fluid channel 165 is in fluidic communication with a portion of interior 129 disposed between first side 131 and second side 132.

Clause 23. Thermal control module 120 of clause 21, wherein sleeve fluid channel 165 is isolated from a portion of interior 129 disposed between first side 131 and second side 132.

Clause 24. Thermal control module 120 of clause 21, wherein:

thermal extension 150 comprises first extension portion 151 and second extension portion 152, both extending along first axis 121 of thermal control module 120 and forming extension channel 153 between first extension portion 151 and a second extension portion 152, first sleeve portion 161 is disposed in extension channel 153 and attached to first extension portion 151, and second sleeve portion 162 is disposed in extension channel 153 and attached to second extension portion 152.

Clause 25. Thermal control module 120 of clause 21, wherein:

sleeve 160 further comprises third sleeve portion 163, forming at least portion of each of plurality of battery receiving openings 141, and sleeve fluid channel 165 extends between third sleeve portion 162 and each of first sleeve portion 161 and second sleeve portion 162.

Clause 26. thermal control module 120 of clause 25, wherein:

sleeve 160 further comprises fourth sleeve portion 164, attached to first side 131 of thermal plate 130, and sleeve fluid channel 165 extends between third sleeve portion 162 and fourth sleeve portion 164.

Clause 27. Thermal control module 120 of clause 10, wherein:

thermal extension 150 comprises plurality of triangular extensions 157, each connected to first side 131 of thermal plate 130; and at least three of plurality of triangular extensions 157 defining each of plurality of battery receiving openings 141.

Clause 28. Thermal control module 120 of clause 27, wherein each of plurality of triangular extensions 157 has at least two curved sides 158.

Clause 29. Thermal control module 120 of any one of clauses 27-28, wherein sleeve 160 fully covers each of plurality of triangular extensions 157 and at least partially extends to first side 131 of thermal plate 130 forming a sleeve spacer in each of plurality of battery receiving openings 141.

Clause 30. Thermal control module 120 of clause 29, wherein first side 131 of thermal plate 130 comprises a plurality of exposed portions 139, wherein each of plurality of exposed portions 139 is concentric with one of plurality of battery receiving openings 141.

Clause 31. Thermal control module 120 of any one of clauses 1-30, wherein thermal plate 130 and first battery engagement component 140 are monolithic.

Clause 32. Thermal control module 120 of any one of clauses 1-31, wherein each of plurality of battery receiving openings 141 is configured to snuggly fit one of batteries 200.

Clause 33. Thermal control module 120 of any one of clauses 1-32, further comprising second battery engagement component 170, thermally coupled and connected to second side 132 of thermal plate 130 and comprising second plurality of battery receiving openings 171, extending along third axis 123 of thermal control module 120, wherein each of second plurality of battery receiving openings 171 is configured to receive one of batteries 200, such that second battery engagement component 170 thermally couples batteries 200 to thermal plate 130, electrically insulates batteries 200 from thermal plate 130, and fluidically isolates batteries 200 from thermal fluid.

Clause 34. Thermal control module 120 of clause 33, wherein:

thermal plate 130 and first battery engagement component 140 are monolithic, thermal plate 130 and second battery engagement component 170 are monolithic, and first side 131 and second side 132 of thermal plate 130 are joined together thereby forming interior 129 of thermal control module 120.

Clause 35. Thermal control module 120 of clause 33, wherein each of first battery engagement component 140 and second battery engagement component 170 comprises insulating coating, electrically insulating batteries 200 from thermal plate 130.

Conclusion

Different examples and aspects of apparatus and methods are disclosed herein that include a variety of components, features, and functionality. It should be understood that various examples and aspects of apparatus and methods disclosed herein may include any of components, features, and functionality of any of other examples and aspects of apparatus and methods disclosed herein in any combination, and all of such possibilities are intended to be within spirit and scope of present disclosure.

Many modifications and other examples of disclosure set forth herein will come to mind to one skilled in art to which disclosure pertains having benefit of teachings presented in foregoing descriptions and associated drawings, Therefore, it is to be understood that disclosure is not to be limited to specific examples presented and that modifications and other examples and aspects are intended to be included within scope of appended claims. Moreover, although foregoing descriptions and associated drawings describe examples in context of certain illustrative combinations of elements and/or functions, it should be appreciated that different combinations of elements and/or functions may be provided by alternative implementations without departing from scope of appended claims.

What is claimed is:

1. A thermal control module for controlling temperature of batteries in a battery pack, the thermal control module comprising:
   a thermal plate, comprising:
      a first portion, comprising a first side;
      a second portion, comprising a second side, offset relative to the first side of the first portion and at least partially defining an interior of the thermal control module together with the first portion, wherein the first portion is attached to the second portion;
      thermal fluid ports, configured to connect to thermal fluid lines and flow a thermal fluid in and out of the interior of the thermal control module; and
   a first battery engagement component, monolithic with the first portion of the thermal plate and comprising first extension channels,
      wherein each of the first extension channels comprises first battery receiving openings and first bridging portions such that each of the first bridging portions is disposed between and joins two adjacent ones of the first battery receiving openings, and
      wherein the first battery engagement component is configured to thermally couple a first set of the batteries to the thermal plate, to electrically insulate the first set of the batteries from the thermal plate, and to fluidically isolate the first set of the batteries from the thermal fluid.

2. The thermal control module of claim 1, wherein:
   the thermal plate comprises a plurality of diffusers disposed within the interior and supported by at least one of the first side or the second side,
   the plurality of diffusers is configured to redirect the thermal fluid through the interior.

3. The thermal control module of claim 2, wherein the plurality of diffusers is arranged into rows with varying angles of diffusing surfaces.

4. The thermal control module of claim 3, wherein the angles of the diffusing surfaces differ for two adjacent ones of the rows of the plurality of diffusers.

5. The thermal control module of claim 1, wherein:
   the thermal plate comprises a divider, extending between the first side and the second side separating at least a portion of the interior into a first part and a second part,
   one of the thermal fluid ports is in fluidic communication with the first part of the interior, and
   another one of the thermal fluid ports is in fluidic communication with the second part of the interior.

6. The thermal control module of claim 1, wherein both of the thermal fluid ports are positioned on a same end of the thermal plate.

7. The thermal control module of claim 1, wherein:
   the first battery engagement component comprises a thermal extension and a sleeve,
   the thermal extension is formed from a metal,
   the sleeve is formed from a thermally-conductive polymer or a thermally-conductive coating, and
   the sleeve forms at least a portion of each of the first battery receiving openings.

8. The thermal control module of claim 1, wherein the first extension channels extend to and is at least partially formed by the first portion.

9. The thermal control module of claim 1, wherein a width of each of the first extension channels is variable.

10. The thermal control module of claim 9, wherein a diameter of each of the first battery receiving openings corresponds to a highest value of to a width of a corresponding one of the first extension channels.

11. The thermal control module of claim 7, wherein:
    the sleeve comprises a plurality of sleeve cups, separated from each other; and
    the plurality of sleeve cups forms a portion of each of the first extension channels and defines each of the first battery receiving openings.

12. The thermal control module of claim 1, further comprising a second battery engagement component, monolithic with the second portion of the thermal plate and comprising second extension channels,
    wherein each of the second extension channels comprises second battery receiving openings and second bridging portions such that each of the second bridging portions is disposed between and joins two adjacent ones of the second battery receiving openings, and
    wherein each of the second battery receiving openings is configured to receive one of the batteries, such that the second battery engagement component is configured to thermally couple a second set of the batteries to the thermal plate, to electrically insulate the second set of the batteries from the thermal plate, and to fluidically isolate the second set of the batteries from the thermal fluid.

13. The thermal control module of claim 12, wherein each of the first battery engagement component and the second battery engagement component comprises an insulating coating, electrically insulating the batteries from the thermal plate.

14. The thermal control module of claim 1, wherein the thermal fluid ports are both parts of the first portion of the thermal plate.

15. The thermal control module of claim 2, wherein:
    the plurality of diffusers comprises a first set and a second set;
    the first set of the plurality of diffusers is monolithic with the first portion of the thermal plate; and
    the second set of the plurality of diffusers is monolithic with the second portion of the thermal plate.

16. The thermal control module of claim 15, wherein each of the first set of the plurality of diffusers is aligned with a corresponding one of the second set of the plurality of diffusers.

17. The thermal control module of claim 11, wherein each of the plurality of sleeve cups comprises side cutouts, aligned with corresponding ones of the first bridging portions of the first extension channels.

18. The thermal control module of claim 7, wherein the thermally-conductive polymer of the sleeve comprises ceramic filer.

19. The thermal control module of claim 7, wherein the sleeve is continuous, at least within each of the first extension channels.

20. The thermal control module of claim 1, wherein the first bridging portions are open and exposed.

* * * * *